United States Patent
Nakano et al.

(10) Patent No.: US 9,178,587 B2
(45) Date of Patent: Nov. 3, 2015

(54) COMMUNICATION SYSTEM, TRANSMITTER, RECEIVER AND COMMUNICATION METHOD

(75) Inventors: Hiroshi Nakano, Osaka (JP); Shimpei To, Osaka (JP); Takashi Onodera, Osaka (JP); Kozue Hirata, Osaka (JP); Hiromichi Tomeba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 593 days.

(21) Appl. No.: 13/582,259

(22) PCT Filed: Jan. 31, 2011

(86) PCT No.: PCT/JP2011/051853
§ 371 (c)(1),
(2), (4) Date: Aug. 31, 2012

(87) PCT Pub. No.: WO2011/108318
PCT Pub. Date: Sep. 9, 2011

(65) Prior Publication Data
US 2012/0327881 A1    Dec. 27, 2012

(30) Foreign Application Priority Data
Mar. 1, 2010    (JP) .................................. 2010-043724

(51) Int. Cl.
*H04W 4/00* (2009.01)
*H04B 7/04* (2006.01)
(Continued)

(52) U.S. Cl.
CPC .......... *H04B 7/0452* (2013.01); *H04J 11/0033* (2013.01); *H04L 25/03305* (2013.01); *H04B 7/0697* (2013.01); *H04L 5/0023* (2013.01); *H04L 5/0051* (2013.01)

(58) Field of Classification Search
USPC ......................................................... 370/329
See application file for complete search history.

(56) References Cited

U.S. PATENT DOCUMENTS

2004/0190484 A1    9/2004   Shin et al.
2005/0249303 A1*  11/2005   Takano ..................... 375/267
(Continued)

FOREIGN PATENT DOCUMENTS

CN    1540882 A       10/2004
EP    2 533 449 A1    12/2012
(Continued)

OTHER PUBLICATIONS

Chinese Office Action issued Oct. 24, 2014 for related Application No. 201180011604.0 with an English translation.
(Continued)

*Primary Examiner* — Faruk Hamza
*Assistant Examiner* — Shah R Zaman
(74) *Attorney, Agent, or Firm* — Birch, Stewart, Kolasch & Birch, LLP

(57) ABSTRACT

The disclosed is a transmission device including a plurality of transmission antennas for transmitting signals in the same channel at the same time point to a plurality of reception devices, characterized by including: a dedicated reference signal generator configured to generate dedicated reference signals for the respective reception devices; a data signal generator configured to generate data signals for the respective reception devices; a spatial multiplexer configured to spatially multiplex at least some of the dedicated reference signals and at least some of the data signals; and a transmitter configured to transmit the spatially multiplexed signals.

9 Claims, 20 Drawing Sheets

(51) Int. Cl.
*H04J 11/00* (2006.01)
*H04L 25/03* (2006.01)
*H04B 7/06* (2006.01)
*H04L 5/00* (2006.01)

(56) References Cited

U.S. PATENT DOCUMENTS

| | | |
|---|---|---|
| 2005/0254556 A1 | 11/2005 | Fujii et al. |
| 2005/0265470 A1 | 12/2005 | Kishigami et al. |
| 2008/0063116 A1 | 3/2008 | Yokoyama |
| 2009/0103497 A1 | 4/2009 | Fernandez-Corbaton et al. |
| 2009/0268662 A1* | 10/2009 | Larsson et al. ............... 370/328 |
| 2010/0220808 A1* | 9/2010 | Kishigami et al. ........... 375/295 |
| 2010/0260288 A1 | 10/2010 | Aoki et al. |
| 2010/0323625 A1 | 12/2010 | Kishigami et al. |
| 2011/0085503 A1* | 4/2011 | Nam et al. ................... 370/329 |
| 2011/0244816 A1 | 10/2011 | Mori et al. |

FOREIGN PATENT DOCUMENTS

| | | | |
|---|---|---|---|
| EP | 2 544 393 A1 | 1/2013 | |
| JP | 2004-201296 A | 7/2004 | |
| JP | 2005-328310 A | 11/2005 | |
| JP | 2009-182894 A | 8/2009 | |
| JP | 2010-114605 A | 5/2010 | |
| WO | WO 2006/103758 A1 | 10/2006 | |
| WO | WO 2009/052363 A2 | 4/2009 | |
| WO | WO 2009/098880 A1 | 8/2009 | |

OTHER PUBLICATIONS

Harashima et al., "Matched-Transmission Technique for Channels With Intersymbol Interference," IEEE Transactions on Communications, vol. COM-20, No. 4, Aug. 1972, pp. 774-780.

Liu et al., "Improved Tomlinson-Harashima Precoding for the Downlink of Multiple Antenna Multi-User Systems," IEEE Communications Society, 2005, pp. 466-472.

Stankovic et al., "Successive Optimization Tomlinson-Harashima Precoding (SO THP) for Multi-User MIMO Systems," IEEE, ICASSP, 2005, pp. 1117-1120.

European Search Report for European Application No. 11750431.6 issued Dec. 6, 2013.

* cited by examiner $u_0 = [1, -1, -1, 1]$
$u_1 = [1, -1, 1, -1]$
$u_2 = [1, 1, -1, -1]$
$u_3 = [1, 1, 1, 1]$
$u_4 = [1, -1, -1, -1]$
$u_5 = [1, -j, 1, j]$
$u_6 = [1, 1, -1, 1]$
$u_7 = [1, j, 1, -j]$

COMMUNICATION SYSTEM, TRANSMITTER, RECEIVER AND COMMUNICATION METHOD

TECHNICAL FIELD

The present invention relates to a mobile communication technique.

BACKGROUND ART

1. Regarding THP

Tomlinson Harashima Precoding (THP) is a technique in which under a situation where a receiver undergoes interference in data communication between a transmitter and the receiver, the transmitter previously knows the interference, previously cancels the interference from a transmission signal and then transmits the signal to the receiver. In this process, this method causes both the transmitter and the receiver to carry out a Modulo (remainder) operation to transmit and receive the signal in which an increase in transmission power due to the cancellation of the interference is suppressed (refer to later mentioned non-patent document 1).

First, a description will be given of the Modulo operation carried out by both the transmitter and the receiver in THP. The Modulo operation is a process of reducing transmission power by keeping the amplitude of a transmission signal within a certain range or less. To be specific, the Modulo operation is an operation in which both the transmission and reception sides add a signal being an integer multiple of a known value $\tau$ to an I-ch (In-phase channel) and a Q-ch (Qadrature channel) of the transmission signal by both the transmission and reception sides, and thereby convert the transmission signal into a signal within a range of $[-\tau/2, \tau/2]$. An example of the Modulo operation is shown in FIG. 17. In FIG. 17, the Modulo operation of shifting a signal represented as ● to a position of ○, and of shifting ● to ○ by adding a perturbation vector $d(=(-2)\tau+j^*(-1)\tau)$ to ●. Here, j represents an imaginary unit. Both the I-ch and the Q-ch of ○ are within the range between the origin and $[-\tau/2, \tau/2]$. Thus, the Modulo operation is effective in keeping the amplitude of a signal within a certain range. Generally, if mean power of a modulation symbol is normalized to 1, a Modulo width $\tau$ is a certain value previously known by the transmission and reception sides, according to the modulation scheme. For example, $\tau=2\sqrt{2}$ in QPSK, $\tau=8/\sqrt{10}$ in 16QAM, and $\tau=16/\sqrt{42}$ in 64QAM.

This Modulo operation enables transmission of a signal in which the increase in transmission power due to removal of interference is suppressed, even in an environment where the reception side undergoes a large interference. The Modulo operation is expressed as

[Formula 1]

$$\text{Mod}_\tau(x) = x - \text{floor}\left(\frac{\text{Re}(x) + \frac{\tau}{2}}{\tau}\right)\tau - j \cdot \text{floor}\left(\frac{\text{Im}(x) + \frac{\tau}{2}}{\tau}\right)\tau. \quad (1)$$

Here, j represents an imaginary unit, Re(x) represents a real part of x, and Im(x) represents an imaginary part of x. In addition, floor(x) represents the largest integer below x.

Next, a principle of THP will be described. Assume that s is a desired signal and f is interference. The transmitter firstly subtracts interference f from desired signal s because THP is based on the assumption that interference f is previously known. However, since the signal s−f resulting from the subtraction normally has a large amplitude, transmission power will be increased if the signal is transmitted as it is. For this reason, the transmitter carries out the Modulo operation on the signal s−f and transmits the resultant signal expressed as $\text{Mod}_\tau(s-f)$.

With this operation, the transmitter can keep the I-ch and the Q-ch of the transmission signal within the range between the origin and $[-\tau/2, \tau/2]$, and thereby transmit a signal with less power than the case of transmitting the signal s−f. Here, assuming that a characteristic of a channel is 1 and ignoring the influence of noise, a reception signal is expressed as $\text{Mod}_\tau(s-f)+f$ because the receiver undergoes interference f. By carrying out the Modulo operation on this reception signal, the receiver can detect the desired signal as in the following formula:

[Formula 2]

$$\text{Mod}_\tau(\text{Mod}_\tau(s-f)+f)=\text{Mod}_\tau(s-f+f)=\text{Mod}_\tau(s)=s \quad (2)$$

By thus carrying out the Modulo operation on the reception side as well, the desired signal s can be reconstructed on the reception side. The above is the mechanism of THP.

2. DL MU-MIMO THP (Overall System Configuration)

As shown in FIG. 18, when a base station (BS) transmits signals to multiple mobile terminals (MTs) at the same time point at the same frequency, a multi-user interference (MUI) occurs usually. Downlink (DL) MU-MIMO (Multi-User Multi Input Multi Output) is a method of using THP to cancel the MUI with high power efficiency, and multiplexing multiple MTs.

DL MU-MIMO THP is a technique based on the premise that the BS knows all channel state information (CSI) of the MTs. This is because THP requires, as described above, that the BS being the transmitter know the interference that the MT being the receiver undergoes, and DL MU-MIMO THP requires that the CSI be used to calculate the interference.

Hereinbelow, a description will be given of configurations of a BS and MT in the DL MU-MIMO THP with reference to the drawings. Although a case of two MTs is used herein to simplify the description, a case of multiplexing any number of MTs by DL MU-MIMO THP can be implemented likewise (refer to later mentioned non-patent document 2).

(BS Configuration (2MTs))

The BS knows CSI for each of the MTs, and simultaneously transmits signals to two MTs at the same time point at the same frequency. At this time, as shown in FIG. 18, in order to prevent the two MTs (MT1, MT2) from interfering with each other, two types of interference affecting each other including interference by signals for MT1 interfering with MT2, and interference by signals for MT2 interfering with MT1 need to be cancelled. The BS cancels one of the two types of interference by THP, and cancels the other by multiplying the interference by a linear filter. FIG. 19 shows a concrete configuration example of a BS for achieving communication with the two MTs. Hereinafter, a description will be given of a configuration of the BS according to this configuration diagram.

(Configuration of BS)

First of all, encoders 101-1, 101-2 convert information bits for the respective MTs into error correcting codes, and input the coded bits for the respective MTs to modulators 103-1, 103-2. The modulators 103-1, 103-2 modulate the coded bits for the respective MTs inputted thereto, and generate modulated signals for the respective MTs. After generating the modulated signal for MT1, the modulator 103-1 inputs a modulation symbol for MT1 to an interference calculator 113 and to a linear filter multiplier 115. After generating the modulated signal for MT2, the modulator 103-2 inputs a modulation symbol for MT2 to an interference subtractor 107.

A linear filter calculator 117 calculates a linear filter and interference coefficient information by use of CSI known to the BS, and inputs them to the linear filter multiplier 115 and the interference calculator 113, respectively. Then, the interference calculator 113 calculates the interference that MT2 undergoes, by use of the interference coefficient information as well as the modulated signal inputted from the modulator 103-1 having generated the modulated signal for MT1, and inputs the interference to the interference subtractor 107. The interference subtractor 107 subtracts the interference that MT2 undergoes from the modulated signal for MT2, and then inputs the signal after the subtraction to a Modulo operation part 111.

The Modulo operation part 111 carries out the Modulo operation shown in formula (1) on the signal after the subtraction, and inputs the signal after the Modulo operation to the linear filter multiplier 115. In FIG. 19, the interference subtractor 107, the interference calculator 113 and the Modulo operation part 111 surrounded with a broken line are referred to as a nonlinear spatial multiplexer 105.

The linear filter multiplier 115 multiplies each of the inputted signal for MT1 and signal for MT2 by a linear filter. With this operation, a Null of the signal for MT2 is directed toward MT1, MT1 can be free from the interference of the signal for MT2.

Thereafter, the linear filter multiplier 115 inputs the signals after the linear filter multiplication to transmitters 121-1, 121-2. The transmitters 121-1, 121-2 perform digital-to-analog conversion on the signals after the linear filter multiplication, upconvert the signals to a carrier frequency and transmit the resultant signals to MT1 and MT2, respectively.

MT Configuration (2MTs)

MT1 and MT2 receive signals transmitted from the BS. Each MT performs reception processing on the reception signal by carrying out the same Modulo operation as the BS. The MT will be described in detail with reference to FIG. 20.

(Configuration)

A receiver 131 downconverts a signal received by an antenna AT from the carrier frequency to baseband and performs analog-to-digital conversion on the signal to generate a baseband digital signal. Then, the receiver 131 inputs the baseband digital signal to a channel compensator 133. The channel compensator 133 performs channel compensation on the baseband digital signal, and inputs the signal after the channel compensation to a Modulo operation part 135. The Modulo operation part 135 carries out the Modulo operation shown in formula (1) on the signal after the channel compensation, and inputs the signal after the Modulo operation to the demodulator 137. The demodulator 137 demodulates the signal after the Modulo operation and inputs the demodulation result to a decoder 141.

(Explanation of Theory)

As has been described with reference to FIG. 19 and FIG. 20, the mechanism of DL MU-MIMO THP includes: using THP to remove one of two types of interferences caused by signals for MT1 and MT2 interfering with each other, and removing the other by multiplying the interference by a linear filter. Hereinafter, this mechanism of DL MU-MIMO THP will be described in detail from a theoretical aspect.

(Definition of Variable)

Assume that $h_{11}$, $h_{12}$ represent complex gain of channels from two antennas of the BS to MT1. Similarly assume that $h_{21}$, $h_{22}$ represent complex gain of channels to MT2. Using these values, a channel matrix H is expressed as:

[Formula 3]

$$H = \begin{pmatrix} h_{11} & h_{12} \\ h_{21} & h_{22} \end{pmatrix}. \tag{3}$$

In addition, assume that $s_1$ and $s_2$ are modulated signals for MT1 and MT2, respectively.

Linear Filter Calculation

As shown in FIG. 19 and FIG. 20, the linear filter calculator 115 uses a linear filter to direct a null of a signal for MT2 toward MT1, to cancel interference by signals for MT2 interfering with MT1. The linear filter calculator 115 obtains this linear filter by performing QR decomposition on an Hermitian conjugate $H^H$ of the channel matrix H. QR decomposition is a method of decomposing an arbitrary matrix into a product of a unitary matrix Q and an upper triangular matrix R, and $H^H$ after the QR decomposition is expressed as:

[Formula 4]

$$H^H = QR \tag{4}$$

Here, each of Q and R is a matrix including two rows and two columns, and R is an upper triangular matrix in which a component of second row first column is 0. The linear filter to be used in the multiplication by the linear filter calculator is the unitary matrix Q of formula (4). When HQ of a combination of the linear filter Q and the actual channel matrix H is considered as an equivalent channel, HQ is expressed as:

[Formula 5]

$$HQ = (QR)^H Q = (R^H Q^H) Q = = R^H \tag{5}$$

As R is an upper triangular matrix, $R^H$ is a lower triangular matrix. Specifically, a component of first row second column of an equivalent channel $R^H$ is 0. Assuming that noise is 0, respective reception signals $y_1$, $y_2$ of MT1 and MT2 can be calculated as:

[Formula 6]

$$\begin{pmatrix} y_1 \\ y_2 \end{pmatrix} = R^H \begin{pmatrix} s_1 \\ s_2 \end{pmatrix} = \begin{pmatrix} r_{11}^* & 0 \\ r_{12}^* & r_{22}^* \end{pmatrix} \begin{pmatrix} s_1 \\ s_2 \end{pmatrix} = \begin{pmatrix} r_{11}^* s_1 \\ r_{12}^* s_1 + r_{22}^* s_2 \end{pmatrix}. \tag{6}$$

Here, a component of row k column l of R is expressed as $r_{kl}$. In addition, * indicates a complex conjugate. It can be seen from formula (6) that $y_1$ does not include an $s_2$ component. To be specific, the BS multiplies signals for MTs by the linear filter Q to prevent signals for MT2 from reaching MT1. In other words, The BS directs the null of the signal for MT2 toward MT1.

(Interference Calculation)

Having cancelled the interference by signals for MT2 interfering with MT1 by use of the linear filter, interference by signals for MT1 interfering with MT2 will next be cancelled by use of afore-mentioned THP.

As shown in formula (2), firstly, interference f needs to be calculated in order for the BS to perform THP. In this case, the value is found by assuming that f is interference after MT2 has performed channel compensation. According to formula (6), a reception signal $z_2$ having undergone the channel compensation by MT2 is expressed as:

[Formula 7]

$$z_2 = 1/r_{22}^* \cdot y_2 = 1/r_{22}^* \cdot (r_{12}^* s_1 + r_{22}^* s_2) = s_2 + r_{12}^*/r_{22}^* \cdot s_1 \quad (7)$$

Since the interference component f indicates terms other than a signal $s_2$ for MT2, the interference is expressed as:

[Formula 8]

$$f = r_{12}^*/r_{22}^* \cdot s_1 \quad (8)$$

Here, f is obtained by multiplying a signal $s_1$ for MT1 by coefficient $r_{12}^*/r_{22}^*$. This coefficient $r_{12}^*/r_{22}^*$ represents the interference coefficient information. The linear filter multiplier calculates the interference coefficient information and inputs the result to the interference calculator, and then the interference calculator calculates the interference f shown in formula (8) with the coefficient $r_{12}^*/r_{22}^*$ and the modulated signal $s_1$ for MT1.

(THP)

The BS calculates a signal $\text{Mod}_f(s_2-f)$ by use of the interference f and the modulated signal $s_2$ for MT2 in the interference subtractor 107 and the Modulo operation part 111, and inputs the signal to the linear filter multiplier 115. The linear filter multiplier 115 multiplies each of the signal $\text{Mod}_f(s_2-f)$ and the signal $s_1$ for MT1 by the linear filter Q and calculates a transmission signal. In this configuration, the interference subtractor 107, the interference calculator 113 and the Modulo operation part 111 shown in FIG. 19 are referred to as the nonlinear spatial multiplexer 105. In addition, the process of calculating the signal to be inputted to the linear filter multiplier 115 by carrying out the interference cancellation and the Modulo operation on the modulated signal is referred to as nonlinear-spatial multiplexing.

(Reception Signal)

Replacing $s_2$ with $\text{Mod}_f(s_2-f)$ in formula (6), the reception signal is found as follows:

[Formula 9]

$$\begin{pmatrix} y_1 \\ y_2 \end{pmatrix} = HQ \begin{pmatrix} s_1 \\ \text{Mod}(s_2-f) \end{pmatrix} = R^H \begin{pmatrix} s_1 \\ \text{Mod}(s_2-f) \end{pmatrix} \quad (9)$$

$$= \begin{pmatrix} r_{11}^* s_1 \\ r_{12}^* s_1 + r_{22}^* \cdot \text{Mod}(s_2-f) \end{pmatrix}.$$

Here, MT2 carries out the Modulo operation after the channel compensation of the reception signal $y_2$. Then, as shown in

[Formula 10]

$$\text{Mod}(1/r_{22}^* \cdot y_2) = \text{Mod}(r_{12}^*/r_{22}^* s_1 + \text{Mod}(s_2 - r_{12}^*/r_{22}^* s_1)) \quad (10)$$
$$= \text{Mod}(r_{12}^*/r_{22}^* s_1 + (s_2 - r_{12}^*/r_{22}^* s_1))$$
$$= s_2,$$

MT2 is able to detect the modulated signal $s_2$ directed thereto. By similarly carrying out the Modulo operation after channel compensation, the modulated signal for MT1 can also be found.

[Formula 11]

$$\text{Mod}(1/r_{11}^* \cdot y_1) = \text{Mod}(r_{11}^*/r_{11}^* s_1) \quad (11)$$
$$= \text{Mod}(s_1)$$
$$= s_1$$

As described above, both MT1 and MT2 are able to detect the signals directed to themselves.

3. Multistream Communication with MTs Having Multiple Reception Antennas

The above description has been given of a method of transmitting a single datastream at a time to different MTs. Meanwhile, as shown in FIG. 21, there is also a technique of using DL MU-MIMO THP to spatially multiplex MTs at the same time point at the same frequency, the MTs each having multiple reception antennas and performing multi-datastream communication by SU-MIMO (refer to non-patent document 3). With this technique, spatial resource can be used efficiently for MTs having multiple reception antennas as well. Hence, even when multi-stream communication is performed for a single terminal, the BS transmits a datastream for each MT after carrying out a Modulo operation thereon.

Regarding DRS (Dedicated Reference Signals)

In DL MU-MIMO THP, data signals are spatially multiplexed by DL MU-MIMO THP and transmitted to all MTs. Meanwhile, demodulation DRSs (Dedicated Reference Signals) for the respective MTs are transmitted by time division or frequency division where the DRSs for the MTs are divided and allocated to orthogonal radio resources (areas divided in time domain or frequency domain, which do not interfere with one another even when data signals or reference signals are allocated thereto).

For example, as shown in FIG. 22, a BS transmits a DRS for MT1 (DRS-MT1), a DRS for MT2 (MT-2) and so on by dividing them into different times, but transmits data signals by spatially multiplexing them by DL MU-MIMO THP. This is because if an MT receives a DRS spatially multiplexed by THP, the MT cannot carry out a Modulo operation on the DRS since the amplitude of the reception signal is unknown, and cannot perform channel estimation by use of the DRS which is transmitted after the Modulo operation (refer to Patent Document 1).

In the case of transmitting the DRS to each MT with an orthogonal radio resource, the BS transmits the DRS previously known to both the BS and the MT (represented as a complex number q on a signal plane). At this time, the BS transmits the DRS to only one MT with a single orthogonal radio resource, and does not transmit signals to other MTs. Accordingly, the MT can receive the DRS transmitted from the BS without being affected by interference, and can divide a reception signal point y of the DRS by q to obtain a channel h=y/q.

On the other hand, if the BS simultaneously transmits the DRSs to multiple MTs by spatial multiplexing using THP as in the case of transmitting a data signal, the MT cannot perform channel estimation. This is because the BS transmits the DRS after carrying out a Modulo operation thereon, and thus the signal to which the MT should refer is not q but the signal q with a perturbation vector d added thereto by the Modulo operation. Specifically, the reference signal is a point represented by q+d, and although the MT should divide the reception signal point y by q+d, the MT is unable to know the value of d in advance. Hence, the MT cannot estimate the value of channel h.

For this reason, DL MU-MIMO THP uses the orthogonal DRS instead of the method of spatially multiplexing the DRSs for the MTs (refer to later mentioned patent document 1).

PRIOR ART DOCUMENT

Patent Document

Patent Document 1: Japanese patent application publication No. 2009-182894

Non-Patent Document

Non-Patent Document 1: H. Harashima and H. Miyakawa, "Matched-Transmission Technique for Channels With Intersymbol Interference," IEEE Transactions On Communications, Vol. Com-20, No. 4, pp. 774-780, August 1972.

Non-Patent Document 2: J. Liu and A Krzymien, "Improved Tomlinson-Harashima Precoding for the Downlink of Multiple Antenna Multi-User Systems," Proc. IEEE Wireless and Communications and Networking Conference, pp. 466-472, March 2005.

Non-Patent Document 3: V. Stankovic and M. Haardt, "Successive optimization Tomlinson-Harashima precoding (SO THP) for multi-user MIMO systems," Proc. IEEE Int. Conf. Acoust., Speech, and Signal Processing (ICASSP), Vol. III, pp. 1117-1120, Philadelphia, Pa., USA, March 2005.

SUMMARY OF THE INVENTION

Problem to be Solved by the Invention

However, the method as represented in FIG. 22 of allocating the DRSs for respective MTs to orthogonal radio resources has a problem that radio resources as many as the number of MTs need to be prepared exclusively for the DRSs, and thus facilitates an enlargement of overhead of inserting DRS.

The present invention has been made in view of the above circumstances, and aims to provide a technique for minimizing degradation in transmission rate, due to insertion of DRS in a communication system using spatial multiplexing by THP.

Means for Solving the Problem

When a base station (BS) transmits a demodulation pilot to a certain MT, a data signal for an MT whose interference cancellation order in DL MU-MIMO THP is later than the certain MT is multiplexed and transmitted According to an aspect of the present invention, provided is a transmission device including a plurality of transmission antennas for transmitting signals in the same channel at the same time point to a plurality of reception devices, characterized by including: a dedicated reference signal generator configured to generate dedicated reference signals for the respective reception devices; a data signal generator configured to generate data signals for the respective reception devices; a spatial multiplexer configured to spatially multiplex at least some of the dedicated reference signals and at least some of the data signals; and a transmitter configured to transmit the spatially multiplexed signals. Preferably, destinations of a dedicated reference signal and a data signal spatially multiplexed by the spatial multiplexer are different reception devices. The spatial multiplexer is preferably a nonlinear spatial multiplexer which performs spatial multiplexing by way of nonlinear processing. In nonlinear processing, interference signals are successively cancelled from a desired signal.

Preferably, the nonlinear spatial multiplexer determines an order of the plurality of reception devices, and multiplexes the dedicated reference signal for a reception device with a data signal for a later reception device in the determined order than the reception device being the destination of the dedicated reference signal.

Preferably, the nonlinear spatial multiplexer includes processing of calculating an interference of the dedicated reference signal for an earlier reception device in the order affecting a later reception device in the order, and cancelling the interference from a data signal for the later reception device in the order. Preferably, the nonlinear spatial multiplexer carries out a Modulo operation on the data signal after the interference cancellation. With respect to one or a plurality of radio resources as a unit, the order may be determined so that turns are evenly assigned to the reception devices. Preferably, the order is changed so that the reception devices are replaced in rotation in each of the units. Preferably, the data signal to be spatially multiplexed with the dedicated reference signal includes control information.

Preferably, the transmission device performs error-correction coding by a lower code rate on information bits of a signal for a later reception device in the order, and then transmits the signal.

The present invention may be a reception device to receive a signal in a communication system in which a transmission device transmits signals to a plurality of reception devices in the same channel at the same time point, the reception device characterized by including: a receiver configured to receive a data signal addressed to the own reception device, the data signal being spatially multiplexed with a dedicated reference signal for another reception device; and a Modulo operation part configured to carry out a modulo operation on the data signal.

The present invention is a communication system including a transmission device including a plurality of transmission antennas for transmitting signals in the same channel at the same time to a plurality of reception devices, the system characterized in that: the transmission device includes a dedicated reference signal generator configured to generate dedicated reference signals (DRSs) for the respective reception devices, a data signal generator configured to generate data signals for the respective reception devices, a spatial multiplexer configured to spatially multiplex at least some of the dedicated reference signals and at least some of the data signals, and a transmitter configured to transmit the spatially multiplexed signals, and the reception device includes a receiver configured to receive a data signal addressed to the own reception device, the data signal being spatially multiplexed with the dedicated reference signal for another reception device, and a Modulo operation part configured to carry out a modulo operation on the data signal.

According to another aspect of the present invention, provided is a communication method performed by a transmission device including a plurality of transmission antennas for transmitting signals in the same channel at the same time point to a plurality of reception devices, the method characterized by including the steps of: generating dedicated reference signals (DRSs) for the respective reception devices, generating data signals for the respective reception devices, spatially multiplexing at least some of the dedicated reference signals for the respective reception devices and at least some of the data signals for the respective reception devices, and transmitting the spatially multiplexed signals. The present invention may be a program for causing a computer to execute the above communication method, or may be a computer readable recording medium recording the program.

The present invention is a processor used by a transmission device including a plurality of transmission antennas for transmitting signals in the same channel at the same time point to a plurality of reception devices, the processor characterized by including: a dedicated reference signal generator configured to generate dedicated reference signals (DRSs) for the respective reception devices; a data signal generator configured to generate data signals for the respective reception devices; a spatial multiplexer configured to spatially multiplex at least some of the dedicated reference signals and at least some of the data signals; and a transmitter configured to transmit the spatially multiplexed signals.

The present invention is a processor used by a reception device to receive a signal in a communication system in which a transmission device transmits signals to a plurality of reception devices in the same channel at the same time point, the processor characterized by including: a receiver configured to receive a data signal addressed to the own reception device, the data signal being spatially multiplexed with a dedicated reference signal for another one of the reception devices; and a Modulo operation part configured to carry out a modulo operation on the data signal.

The description herein includes the contents of the description and/or the drawings provided in Japanese Patent Application Publication No. 2010-043724, which is the basis of priority of the present application.

Effects of the Invention

According to the present invention, in a communication system using spatial multiplexing by THP, a data signal can be multiplexed with the same radio resource as a demodulation pilot without interfering therewith, and thereby degradation in transmission rate due to the insertion of DRS can be minimized.

MODES FOR CARRYING OUT THE INVENTION

Hereinbelow, a description will be given of a mobile communication technique according to embodiments of the present invention with reference to the drawings.

First Embodiment

In conventional DL MU-MIMO THP, a BS transmits DRSs to respective MTs by use of orthogonal radio resources. This embodiment aims to provide a method of multiplexing a data signal with a radio resource used exclusively for a DRS. Thus, it is possible to minimize degradation in transmission rate due to insertion of the DRS. Here, a data signal refers to a modulated signal not including a reference signal, and may be a control signal. Hereinafter, a detailed configuration of this embodiment will be described with reference to the drawings.

1) Configuration of BS

Figure 1:
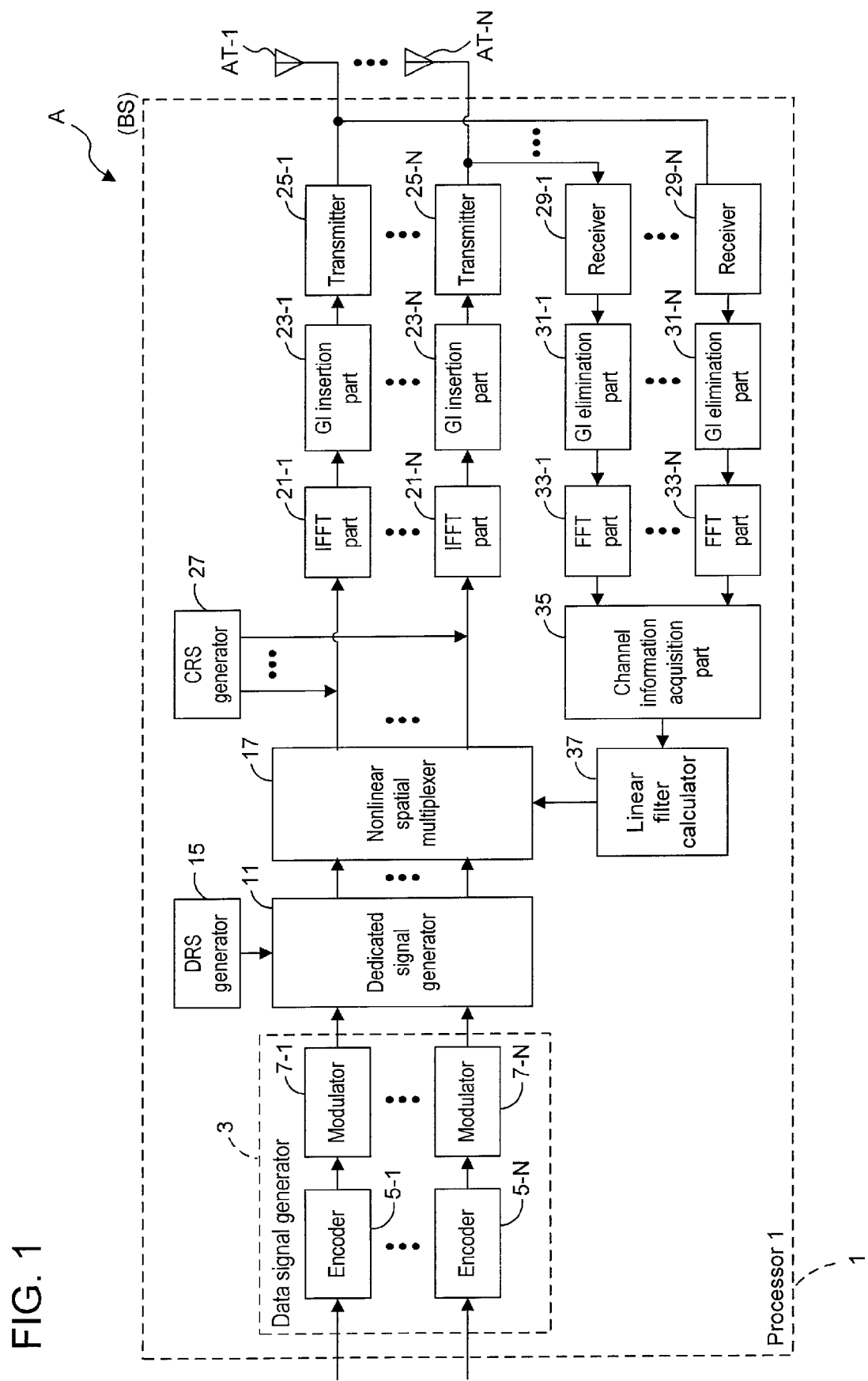
FIG. 1 is a functional block diagram showing an exemplar configuration of a BS in an embodiment of the present invention.

FIG. 1 is a functional block diagram showing an exemplar configuration of a base station (BS) in this embodiment. While the conventional example described above has been described for the case where the number of MTs and the number of antennas of the BS are both two to simplify the description, the exemplar configuration in FIG. 1 will be described for a case including an arbitrary N number of MTs as an example.

A BS (A) firstly generates common reference signals (CRSs) for antennas AT to N respectively, and inputs the CRSs to IFFT parts 21-1 to N. The IFFT parts 21-1 to N perform IFFT on the CRSs, generate baseband digital signals and input the baseband digital signals to GI (Guard Interval) insertion parts 23-1 to N. The GI insertion parts 23-1 to N respectively add GIs to the baseband digital signals, and input the signals to which the GI is added to transmitters 25-1 to N. The transmitters 25-1 to N perform digital-to-analogue conversion on the inputted CRSs, upconvert them to generate radio signals of a carrier frequency, and transmit the CRSs to the antennas AT-1 to N.

Thereafter, an MT estimates channel states from each of the antennas of the BS to the MT itself by use of the CRS, and transmits a radio signal containing channel state information (channel state signal) to the BS. Receivers 29-1 to N of the BS receive channel state signals via the antennas AT-1 to N, downconvert the channel state signals to generate baseband signals, and input the baseband signals to GI elimination parts 31-1 to N. The GI elimination parts 31-1 to N respectively eliminate the GIs from the inputted baseband digital signals, and input them to FFT parts 33-1 to N. The FFT parts 33-1 to N perform FFT on the baseband digital signals from which the GI is eliminated, calculate signals in a frequency domain, and input the signals in the frequency domain to a channel state information acquisition part 35. The channel state information acquisition part 35 acquires channel state information from the baseband digital signals, and inputs the information to a linear filter calculation part 37.

The linear filter calculation part 37 calculates a linear filter and interference coefficient information by use of the channel state information, and inputs the linear filter and the interference coefficient information to a nonlinear spatial multiplexer 17. While an operation of the linear filter calculator 37 is the same as that mentioned in the conventional technique when the number of MTs is N=2, an operation thereof when the number of MTs is generalized to N will be described hereafter.

In this description, a vector H (called "channel matrix" below) represents complex gain of a channel from the q-th transmission antenna of the BS to the p-th MT. In addition, a dedicated signal generated in a dedicated signal generator 11 is defined as a vector s. s is an N-dimension complex column vector, and each component of s is a DRS or a modulated signal obtained by encoding and modulating information bits. Firstly, the linear filter calculator 33 calculates a linear filter and interference coefficient information. To be specific, QR decomposition is performed on an Hermitian conjugate $H^H$ of the channel H.

[Formula 12]

$$H^H = QR \qquad (12)$$

Thereafter, when a combination of vector Q as a linear filter and an actual channel H is considered to be an equivalent channel, the equivalent channel is expressed as:

[Formula 13]

$$HQ = R^H Q^H Q = R^H \qquad (13)$$

$R^H$ is a lower triangular matrix in which in the first row, components apart from the diagonal component (component of first row first column) are 0. In addition, matrix A is assumed to be a diagonal matrix consisting only of diagonal components of $R^H$. Q represents the linear filter outputted by the linear filter calculator, and $A^{-1}R^H - I$ (=F in this description) represents the interference coefficient information.

$A^{-1}$ represents an inverse matrix of A. $R^H$ is multiplied by $A^{-1}$ because, as in formula (8), it is necessary to calculate a coefficient for obtaining an interference signal contained in the reception signal after channel compensation by each MT.

A unit matrix I is subtracted to remove components corresponding to data signals and calculate only the interference components. The linear filter calculator 37 calculates a linear filter and interference coefficient information by the method described above, and inputs the linear filter Q and interference coefficient information F to the nonlinear spatial multiplexer 17.

Encoders 5-1 to N convert information bits for the respective MTs into error correcting codes, and input the coded bits to modulators 7-1 to N. The modulators 7-1 to N modulate the inputted bits, generate modulated signals and input the modulated signals to the dedicated signal generator 11. In this configuration, a component including the encoders 5-1 to N and the modulators 7-1 to N are referred to as a data signal generator 3. In addition, a DRS generator 15 generates DRSs for the MTs and inputs them to the dedicated signal generator 11.

The dedicated signal generator 11 generates a dedicated signal by use of data signals and DRSs. This dedicated signal is a signal to be transmitted to each MT, and is a signal not having undergone any processing for canceling interference between the MT and other MTs. In the dedicated signal in this embodiment, data signals are allocated under a certain rule to radio resources that were originally used exclusively for DRSs. With this allocation method, a higher transmission rate can be achieved as compared with the conventional technique in which data cannot be multiplexed with radio resources for DRSs. This allocation method is an essential part of this embodiment, and since it uses the principle of the nonlinear spatial multiplexer 17 to be described next, detailed description of the method will be given after the description of the nonlinear spatial multiplexer 17. Note that the dedicated signal generator 11 inputs the generated dedicated signal to the nonlinear spatial multiplexer 17.

The nonlinear spatial multiplexer 17 uses the interference coefficient information and the linear filter inputted from the linear filter calculator 37, to perform nonlinear spatial multiplexing on the signals for MTs. Nonlinear spatial multiplexing is the same nonlinear processing as the processing performed by the nonlinear spatial multiplexer of the conventional technique, and is processing of spatially multiplexing the dedicated signals by previously eliminating MUI of the dedicated signals on the BS side using THP and the linear filter.

Figure 2:
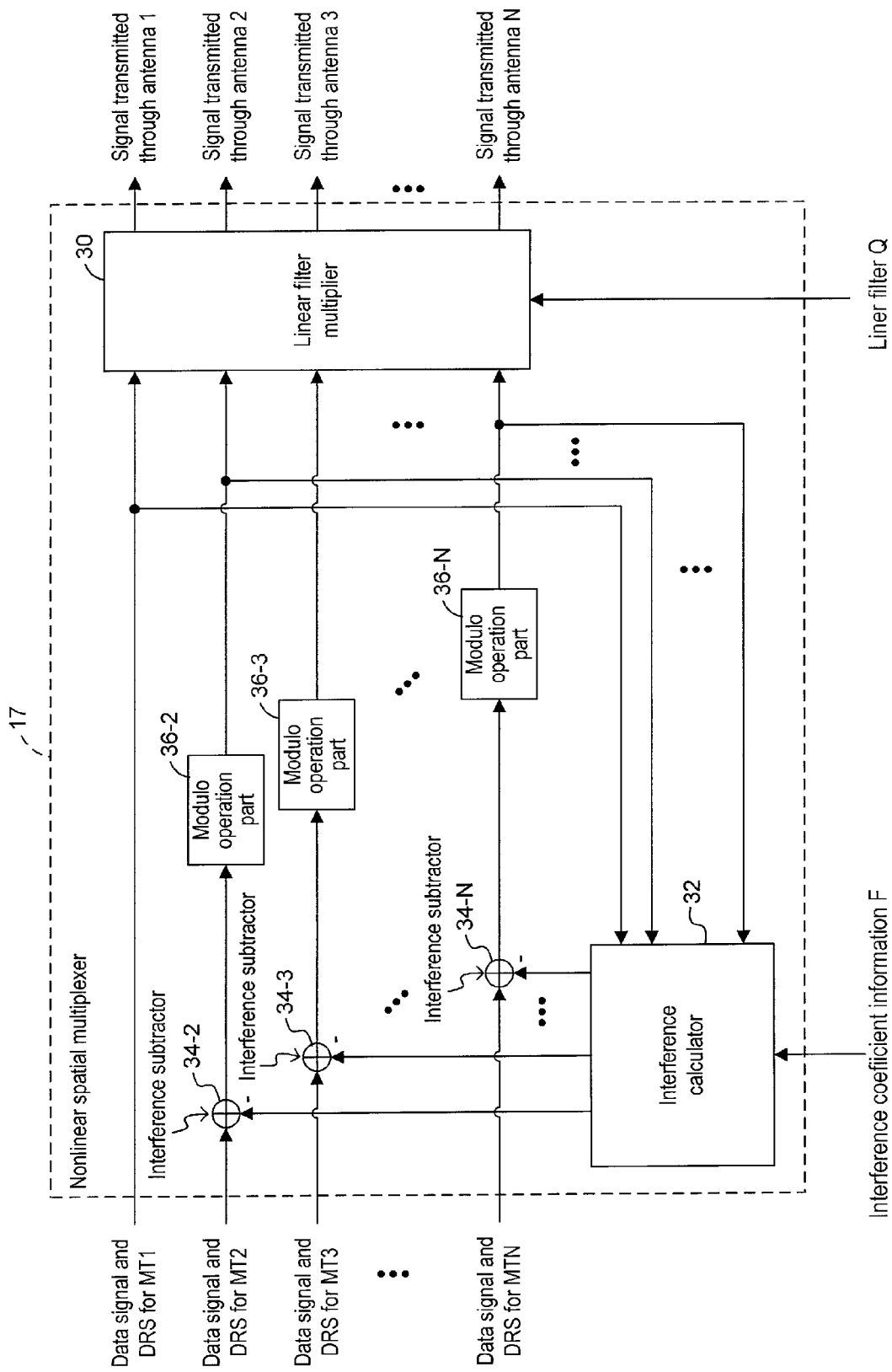
FIG. 2 is a functional block diagram showing a nonlinear spatial multiplexer calculating signals for N MTs.
Figure 3:
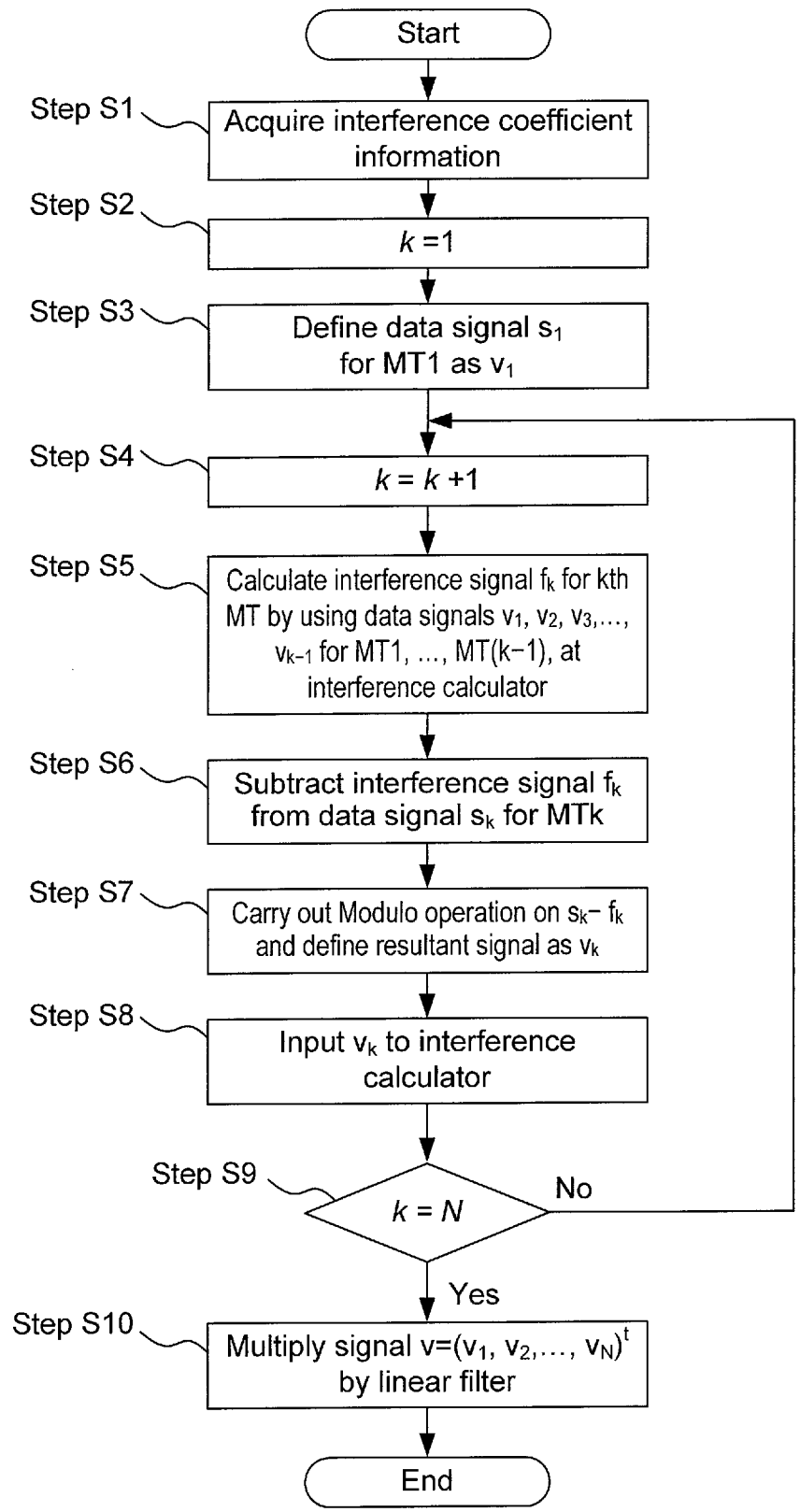
FIG. 3 is a flowchart showing a flow of processing performed by the part shown in FIG. 2.

Here, a description will be given of the nonlinear spatial multiplexing in a case where the number of MTs is generalized to N. FIG. 2 shows the nonlinear spatial multiplexer 17 calculating signals for N MTs, and FIG. 3 is a flowchart showing a processing flow of this part. In addition, the N MTs are successively referred to as MT1 to MTN from the top.

A description will first be given of an operation of the nonlinear spatial multiplexer 17 for spatially multiplexing only data signals, and the method of multiplexing a DRS and a data signal will be described together with an operation of the dedicated signal generator 11. When the processing starts, at first, an interference calculator 32 acquires interference coefficient information calculated by the linear filter calculator 37 (step S1 of FIG. 3). Subsequently, 1 is assigned to a variable k taking values from 1 to N (step S2). Then, a data signal $s_1$ for MT1 is defined as $v_1$ (step S3). Here, $v_1, \ldots, v_N$ are signals inputted to the dedicated signal configuration part 11, and $v_2, \ldots, v_N$ are calculated in the processing from step S4 to step S10. Hereinbelow, an operation in a case where k takes any of values 2 to N is generally described by use of the variable k.

First, 1 is added to the variable k (step S4). Then, the interference calculator 41 calculates an interference signal $f_k$ that MTk undergoes by using the following formula (step S5):

[Formula 14]

$$f_k = r_{1k}^* v_1 + \ldots + r_{kN}^* v_N \tag{14}$$

Here, a component of row p column q of R in formula (13) is expressed as $r_{pq}$. The interference calculator 32 inputs an interference signal $f_k$ to an interference subtractors 34-2 to N corresponding to MTk. Then, the interference subtractors 34-2 to N subtract $f_k$ from a data signal $s_k$ and calculates a signal $s_k - f_k$ (step S6). In addition, the interference subtractors 34-2 to N input the signal $s_k - f_k$ to a Modulo operation part 36-2 to k corresponding to MTk. Modulo operation parts 36-2 to N are arranged to respectively connect to interference subtractors 34-2 to N corresponding to the MTs MT2 to MTN. Each of the Modulo operation parts 36-2 to N carries out a Modulo operation shown in formula (1) on a signal inputted thereto and defines a resultant signal $\text{Mod}(s_k - f_k)$ as $v_k$ (step S7). In addition, the Modulo operation parts 36-2 to N input $v_k$ to the interference calculator 32 (step S8). If k=N, the processing proceeds to step S10, and if not, the processing returns to step S4 to calculate $v_{k+1}$ of the MT of the next number (step S9). Thus, the nonlinear spatial multiplexer 17 successively performs interference cancellation on the signals of the respective MTs. This order of MTs in which the nonlinear spatial multiplexer 17 performs the interference cancellation is called interference cancellation order. In the end, a signal $v = (v_1, v_2, \ldots, V_N)^T$ is inputted to a linear filter multiplier 30, and the linear filter multiplier 30 multiplies a signal v by a linear filter Q. Components of the signal Qv after multiplication are signals to be transmitted from the respective antennas, and are inputted to the IFFT parts 21-1 to N corresponding to the antennas AT-1 to N (step S10).

The IFFT parts 21-1 to N perform IFFT on the signals inputted from the linear filter multiplier 30, generate baseband digital signals and input the baseband digital signals to the GI insertion parts 23-1 to N. The GI insertion parts 23-1 to N respectively add GIs to the baseband digital signals, and input the signals to which the GI is added to transmitters 25-1 to N. The transmitters 25-1 to N perform digital-to-analogue conversion on the signals to which the GI is added, upconvert them to generate radio signals of a carrier frequency, and transmit the dedicated signals to the respective MTs via the antennas.

Figure 4A:
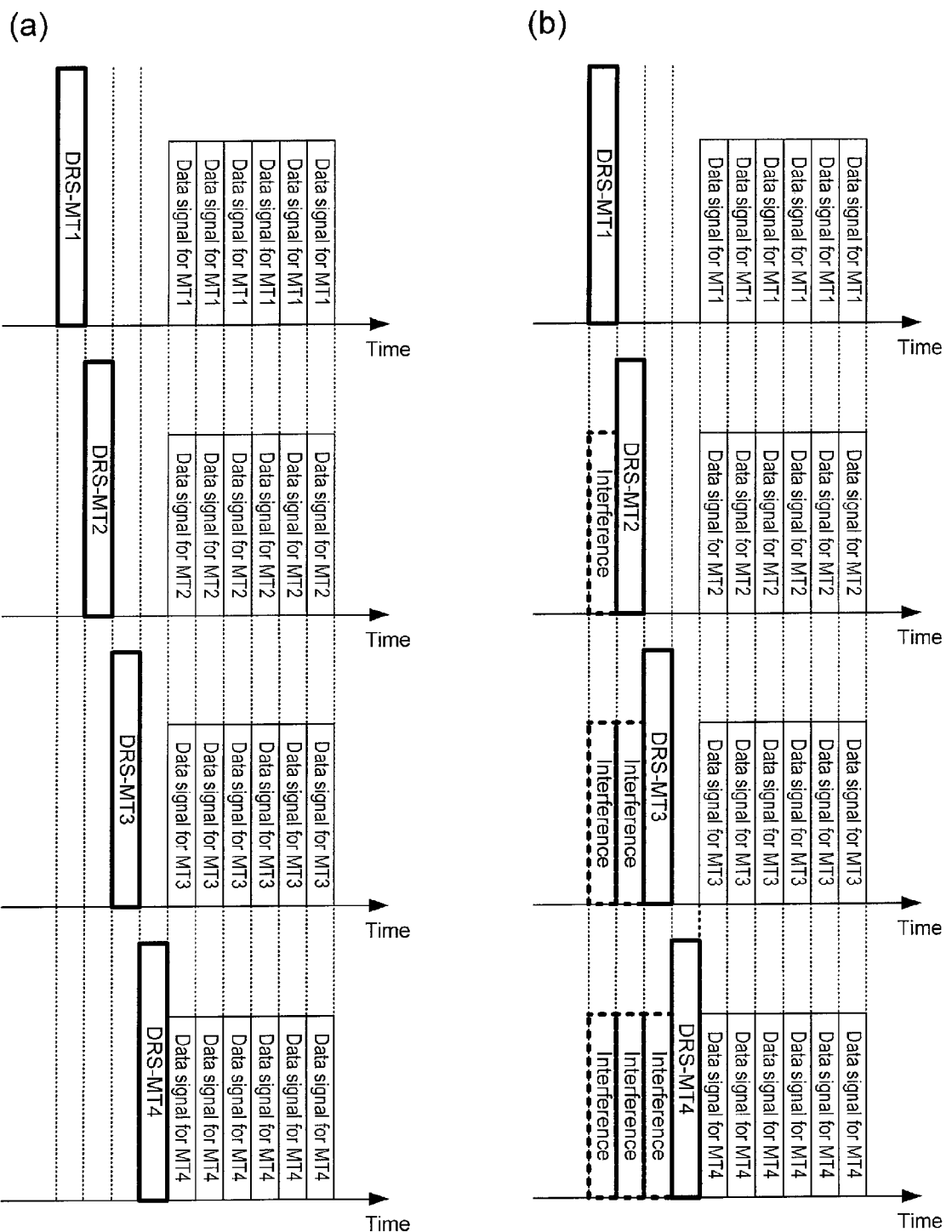
FIG. 4A is a diagram showing an example of dedicated signal allocation generated by a dedicated signal allocation part in a conventional example.

Lastly, an operation of the dedicated signal generator 11 being the main part of this embodiment will be described. At first, part (a) of FIG. 4A shows a dedicated signal allocation of a conventional example. In FIG. 4A, DRSs to be transmitted to the respective MTs are expressed as DRS-MT1, DRS-MT2, ..., part (a) of FIG. 4A shows a dedicated signal generated on the BS side, and part (b) of FIG. 4A shows a signal received by an MT. Referring to FIG. 4A, it can be seen that the BS does not transmit any other signal with the radio resource for DRS. If the BS transmits a data signal with a radio resource for DRS, the DRS will similarly undergo interference. Hence, THP may also be performed on the DRS. However, as was described in the conventional example, the MT cannot perform channel estimation using DRS if THP is also performed on the DRS.

This situation will be described by use of the equivalent channel calculated in formula (13). Assuming that the BS transmits a data signal $s_1$ for MT1 by spatially multiplexing the signal with a radio resource used to transmit DRS p for MT2, reception signals of the respective MTs are expressed as:

[Formula 15]

$$[r_{11}^* s_1, r_{12}^* s_2 + r_{22}^* p, r_{13}^* s_1 + r_{23} p, r_{14}^* s_1 + r_{24}^* p]^T = R^H [s_1, p, 0, 0]^T \tag{15}$$

Here, rows on both sides represent reception signals of the respective MTs, and noise is ignored. Although MT2 needs to receive a DRS and estimate $r^*_{22}$ being complex gain of channels, MT2 instead receives a signal expressed as $r^*_{12} s_2 + r^*_{22} p$. As a result, even if the MT cancels the interference $r^*_{12} s_2$ contained in the reception signal by THP, the MT cannot perform channel estimation using DRS as in the conventional example.

Meanwhile, when the BS transmits data signals, the nonlinear spatial multiplexer 17 successively cancels interference in the data signals for the respective MTs, according to the flowchart shown in FIG. 3. At this time, since the equivalent channel $R^H$ taking into account the linear filter is a lower triangular matrix, in reality, a signal for an MT interferes with an MT whose interference cancellation order is later, and on the other hand does not interfere with an MT whose interference cancellation order is earlier. The reason that the MT with the earlier interference cancellation order is not interfered will be described by use of the equivalent channel $R^H$.

Even if the BS transmits a data signal $s_3$ for MT3 and a data signal $s_4$ for MT4 of interference cancellation orders later than MT2 by spatially multiplexing them with a radio resource used to transmit DRS p for MT2, MT2 can receive the DRS without interference. This is expressed as:

[Formula 16]

$$[0, r_{22}^* p, r_{23}^* p + r_{33}^* s_3, r_{24}^* p + r_{34}^* s_3 + r_{44}^* s_4]^T = R^H [0, p, s_3, s_4]^T \tag{16}$$

No signal is transmitted to MT1, and thus MT2's reception signal is $r^*_{22} p$, meaning that it does not undergo interference. In addition, it can be seen that MT3 and MT4 respectively receive the data signals $r^*_{33} s_3$ and $r^*_{44} s_4$ directed thereto, as well as interference $r^*_{23} p$ and $r^*_{24} p + r^*_{34} s_3$.

Specifically, if the BS transmits a data signal with the same radio resource as a DRS to an MT of an earlier interference cancellation order than an MT being a destination of the DRS, the MT being the destination of the DRS is affected by interference. On the other hand, if the BS transmits a data signal with the same radio resource as a DRS to an MT of a later interference cancellation order than an MT being a destination of the DRS, the MT being the destination of the DRS is not interfered.

Figure 4B:
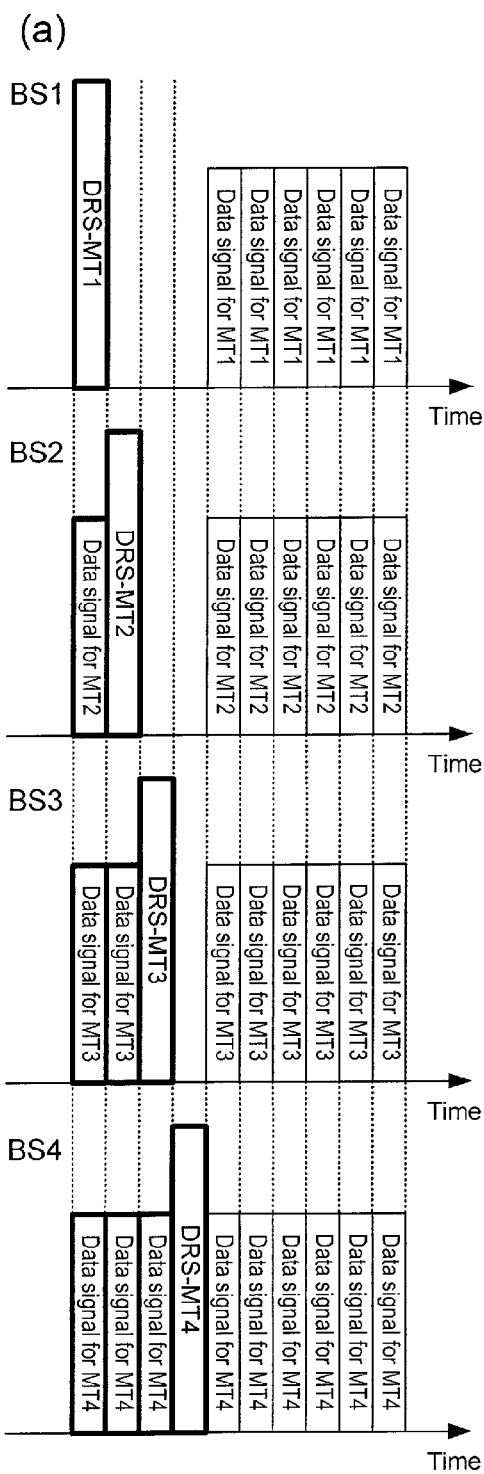
FIG. 4B is a diagram showing an exemplar configuration of a dedicated signal of this embodiment.
Figure 4B:
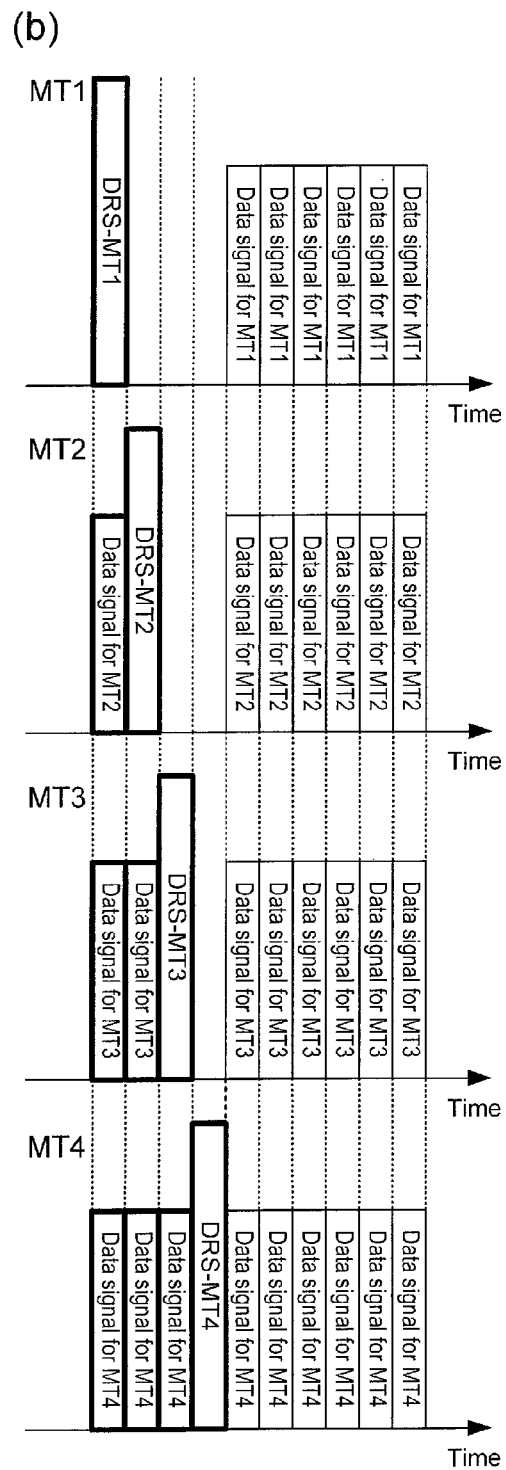

Hence, this embodiment uses a dedicated signal configuration as shown in FIG. 4B. In FIG. 4B, DRSs to be transmitted to the respective MTs are expressed, as in the case of FIG.

4A, as DRS-MT1, DRS-MT2, . . . , part (a) of FIG. 4B shows a dedicated signal generated by the BS, and part (b) of FIG. 4B shows a signal received by an MT. These indicate that data signals can be transmitted to MT3 and MT4 by canceling interference as calculated in formula (16) and performing THP carrying out a Modulo operation. Accordingly, as shown in part (a) of FIG. 4B, the BS can transmit data signals with radio resources for DRSs by spatial multiplexing using THP, to an MT of a later interference cancellation order than the MT being a destination of the DRS.

Figure 5:
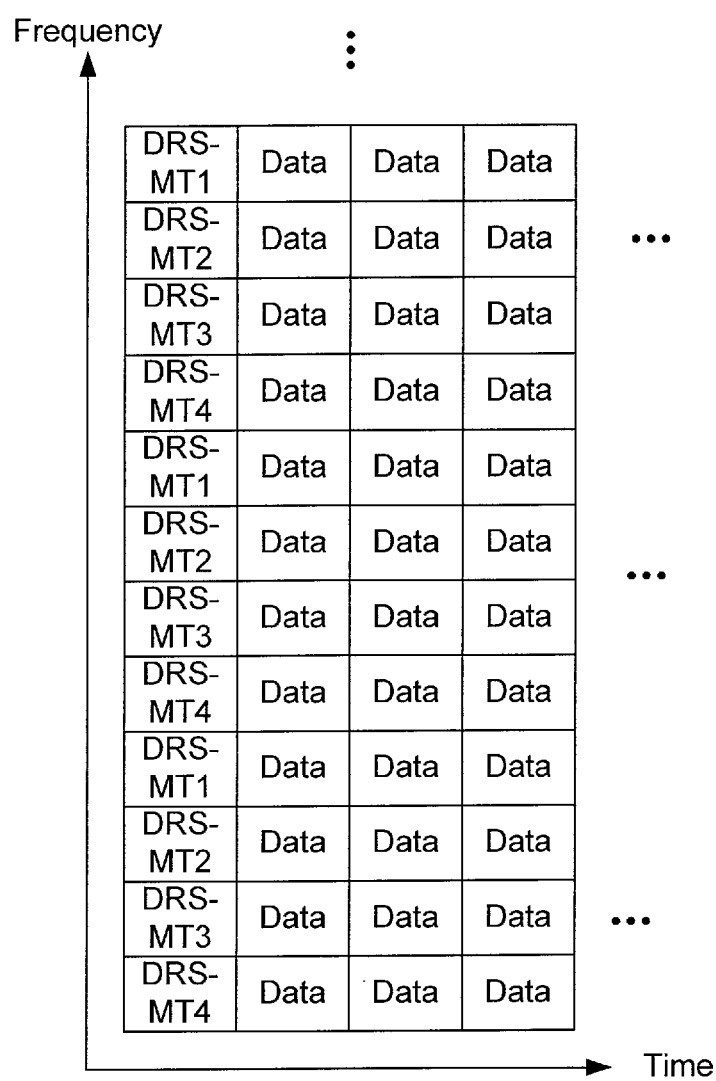
FIG. 5 is a diagram showing an example as another configuration of a dedicated signal, in which radio resources for DRSs are allocated in a frequency domain.
Figure 6:
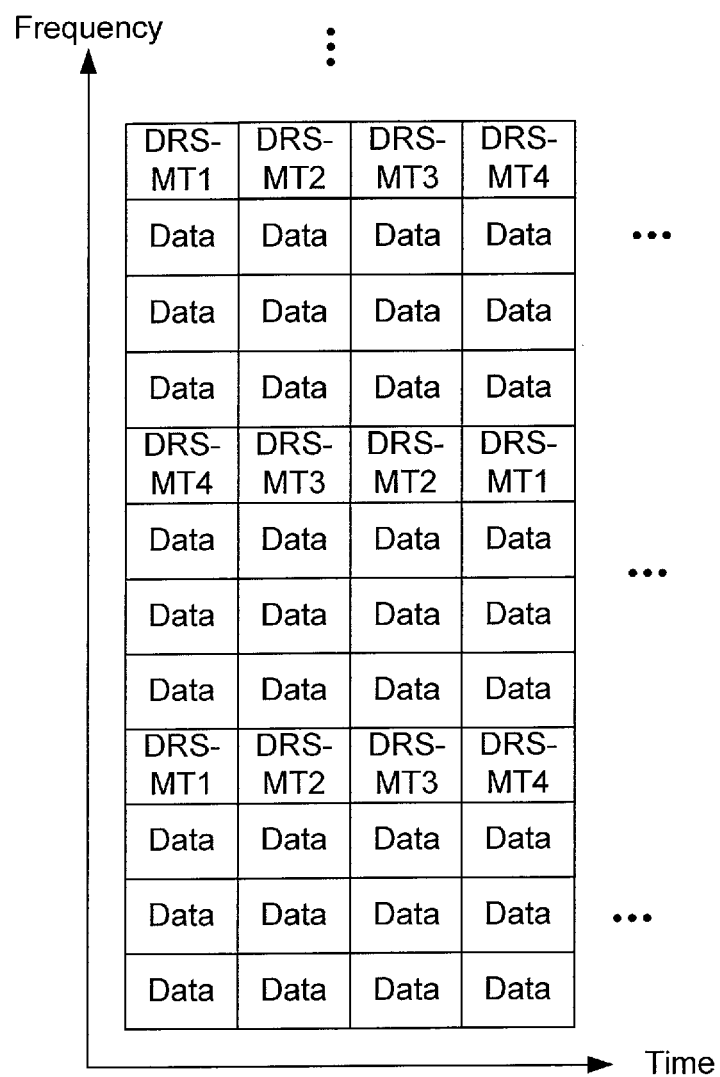
FIG. 6 is a diagram showing an example as another configuration of a dedicated signal in which radio resources for DRSs are allocated in both time and frequency domains.

Note that although for the sake of simplicity the DRSs are allocated in a time domain in FIG. 4A and FIG. 4B, the configuration is not limited to this, and DRSs may be allocated in the frequency domain as in FIG. 5, or may be allocated in both time and frequency domains as in FIG. 6.

As has been described, with the method described above, the BS can transmit more data signals than in the conventional example as shown in FIG. 4B, so that transmission rate can be improved. Radio resources of at least the number of MTs are used for DRSs, and thus the larger the number of MTs involved, the larger the improvement effect in the transmission rate of this embodiment as compared to the conventional example becomes.

Configuration of MT

An exemplar configuration of a mobile terminal (MT) of this embodiment will be described with reference to FIG. 7. A receiver 51 of an MT (B) receives a signal containing CRSs transmitted by the BS via an antenna AT, downconverts the signal to generate a baseband digital signal and inputs the baseband digital signal to a GI elimination part 53. The GI elimination part 53 eliminates a GI from the base band digital signal inputted from the receiver 51, and inputs the signal to an FFT part 55. The FFT part 55 performs FFT on the baseband digital signal from which the GI is eliminated, calculates a signal in the frequency domain and inputs the signal in the frequency domain to a signal separator. The signal separator 57 separates the CRSs corresponding to the respective antennas of the BS from the baseband digital signal, and inputs them to a CRS channel estimation part 61. The CRS channel estimation part 61 estimates channel states from the BS to the own MT on the basis of the received CRSs, and inputs the estimated channel state information to a channel state information generator 63. The channel state information generator 63 inputs channel state signals to an IFFT part 65 by using the channel state information. The IFFT part 65 performs IFFT on the signals inputted from the channel state information generator 63, generates a baseband digital signal and inputs the baseband digital signal to a GI insertion part 67. The GI insertion part 67 adds a GI to the baseband digital signal and inputs the signal to which the GI is added to a transmitter 71. The transmitter 71 performs digital-to-analogue conversion on the inputted channel state signal to upconvert it into a radio signal of a carrier frequency, and transmits the channel state signal to the BS via the antenna AT.

Moreover, the receiver 51 of the MT receives a signal containing DRSs and data signals via the antenna AT, downconverts the signal to generate a baseband digital signal, and inputs the baseband digital signal to the GI elimination part 53. The GI elimination part 53 eliminates the GI from the baseband digital signal inputted from the receiver 51 and inputs the signal to the FFT part 55. The FFT part 55 performs FFT on the baseband digital signal from which the GI is eliminated, calculates a signal in the frequency domain and inputs the signal in the frequency domain to the signal separator 57. The signal separator 57 separates the baseband digital signal into DRSs and data signals, and inputs the DRSs to a DRS channel estimation part 73 and the data signals to a channel compensator 75. At this time, signal separation is carried out according to the signal configuration as shown in FIG. 4B. The DRS channel estimation part 73 estimates channels according to the inputted DRSs, and inputs information indicating channel states to the channel compensator 75. In addition, the DRS channel compensator 75 performs channel compensation on the data signals by use of the information indicating channel states, and inputs the signals to a Modulo operation part 77. The Modulo operation part 77 carries out Modulo operations on the data signals and inputs the data signals after the Modulo operation to a demodulator 81. The demodulator 81 demodulates the data signals after the Modulo operation and inputs the demodulation result to a decoder 83. The decoder 83 performs decoding on the inputted demodulation result and outputs information bits.

(Application to Chips)

Furthermore, functions according to the BS of the above method may be executed in a processor 1 as shown in FIG. 1. The processor 1 includes the receivers 29, the channel information acquisition part 35, the CRS generator 27, the GI elimination part 31, the FFT part 33, the GI insertion part 23 and the IFFT part 21 in addition to the DRS generator 15, the dedicated signal generator 11, the nonlinear spatial multiplexer 17, the data signal generator 3 and the transmitters 25 executing the method of this embodiment. However, the configuration may alternatively include only the DRS generator 15, the dedicated signal generator 11, the nonlinear spatial multiplexer 17, the data signal generator 3 and the transmitters 25, or may be a configuration including other functions together with the functions. There is no limitation on the configuration to be included. A chip may be configured of a monolithic IC or a hybrid IC, or may include other electronic components. Regardless of the configuration, any implementation functioning as described in the above embodiment is within the scope of the present invention.

Figure 7:
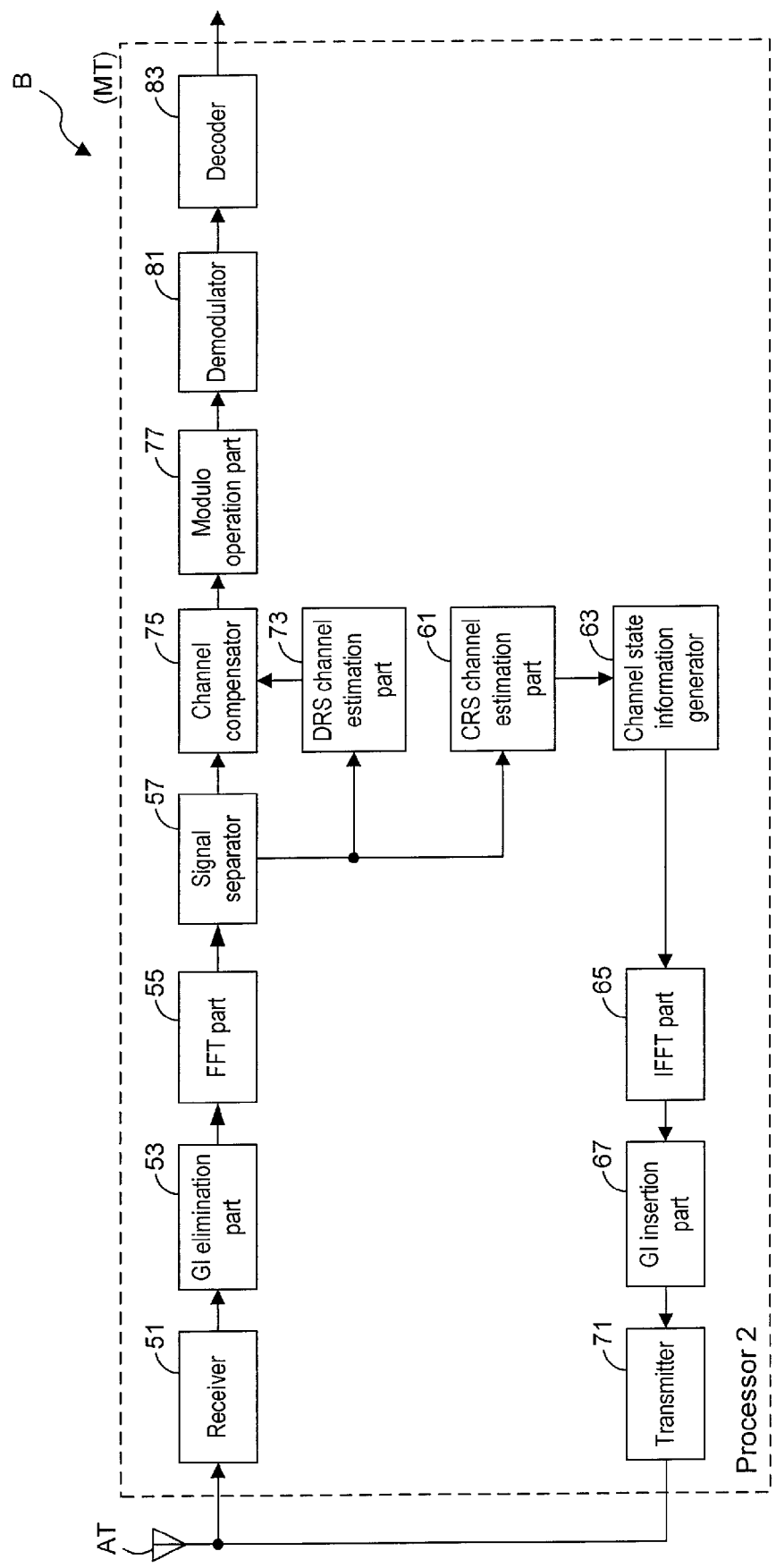
FIG. 7 is a diagram showing an exemplar configuration of an MT of this embodiment.

Additionally, functions according to the MT of the above method may be executed in a processor 2 as shown in FIG. 7. The processor includes the channel compensator 75, the CRS channel estimation part 61, the channel state information generator 63, the transmitter 71, the Modulo operation part 77, the demodulator 81 and the decoder 83 in addition to the receiver 51, the signal separator 57 and the DRS channel estimation part 73 executing the method of the present application. However, the configuration is not limited to this, and alternatively may include only the receiver 51, the signal separator 57 and the DRS channel estimation part 73, or may be a configuration including other functions together with the functions. This point, i.e., the point that component elements of a chip being unlimited is the same as the aforementioned functions according to the BS.

Second Embodiment

Although the above first embodiment allows an increase in the transmission rate as compared to the conventional example, there is variation in the transmission-rate increase amounts among the MTs depending on the interference cancellation order. For example, while MT1 being the first in the interference cancellation order is transmitted at the same transmission rate as the conventional example, MT4 can be transmitted by multiplexing additional data signals with DRSs for MT1 to MT3, resulting in a large increase in the transmission rate. The differences in the transmission rates are inconvenient when units of encoding blocks for allocation are fixed, or the number of bits for allocation is previously fixed by a standardized specification and the like.

In view of these circumstances, an object of this embodiment is to achieve uniform transmission rates for the respective MTs.

Figure 8:
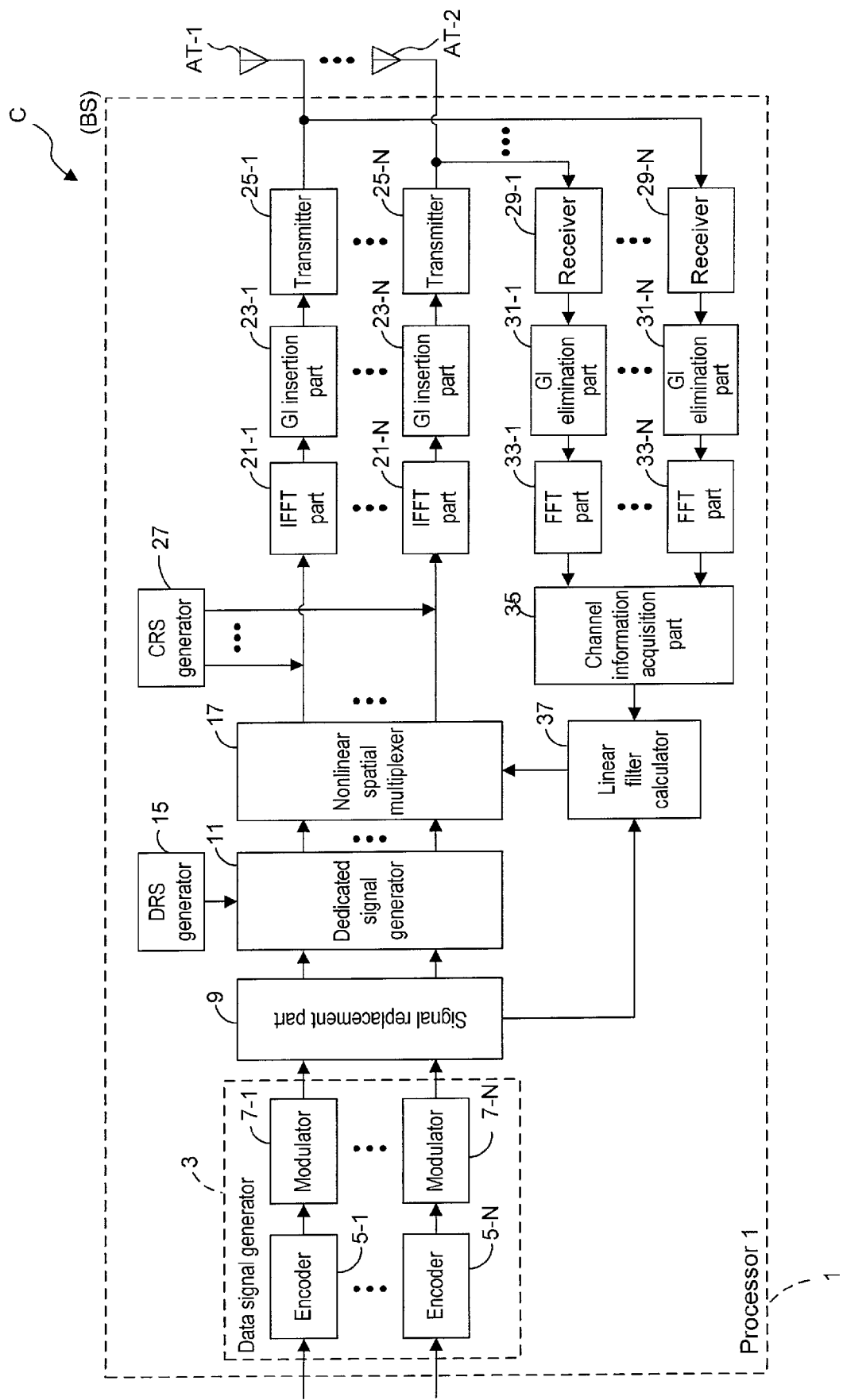
FIG. 8 is a functional block diagram corresponding to FIG. 1 and showing an exemplar configuration of a BS (C) according to a communication technique of this embodiment.
Figure 9:
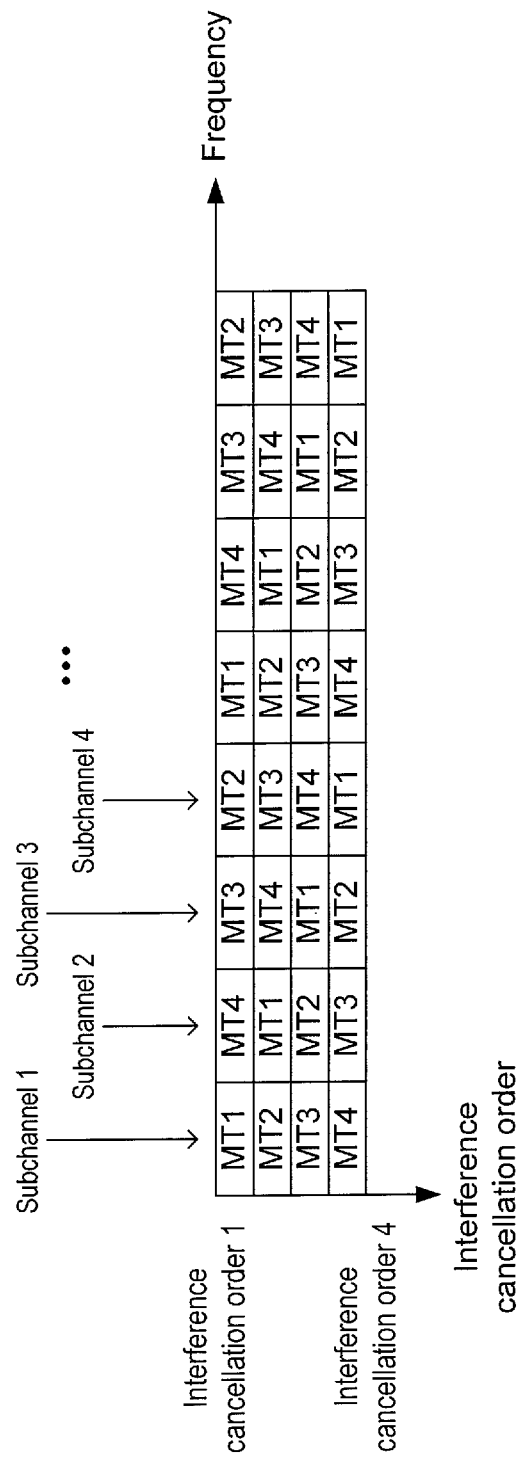
FIG. 9 is a diagram showing an example in which the order of data signals for respective MTs is replaced in rotation for each subchannel.

FIG. 8 is a functional block diagram showing an exemplar configuration of a BS (C) using a communication technique according to this embodiment, and is a figure corresponding to FIG. 1. Compared with FIG. 1, FIG. 8 includes a signal replacement part 9 for replacing data signals, inserted between a data signal generator 3 and a dedicated signal generator 11. The signal replacement part 9 cyclically replaces data signals for respective MTs for each subchannel as shown in FIG. 9, for example. With this method, the interference cancellation opportunities are evenly allocated to the MT, so that the transmission rates become uniform for all MTs as in the configuration of the dedicated signal shown in FIG. 10. Note that a subchannel is a frequency band formed of one or multiple subcarriers in OFDM communication.

Since this embodiment enables a uniform increase in the transmission rates of all MTs, the BS can allocate, to a data signal spatially multiplexed with a DRS, a control signal whose number of transmission bits normally needs to be fixed among MTs.

In addition, the signal replacement part 9 is required to input the changed interference cancellation order to a linear filter calculator 37. This is because a change in the interference cancellation order changes the linear filter and interference coefficient information. When the interference cancellation order is changed, the linear filter calculator 37 replaces each row of channel H according to the interference cancellation order, and then carries out the operation described in the first embodiment.

Moreover, since exemplar configurations of the BS and MT of this embodiment may be the same as the exemplar configuration of the first embodiment except for the above signal replacement part 9, explanation for the other parts are cited from the first embodiment and omitted herein.

Figure 10:
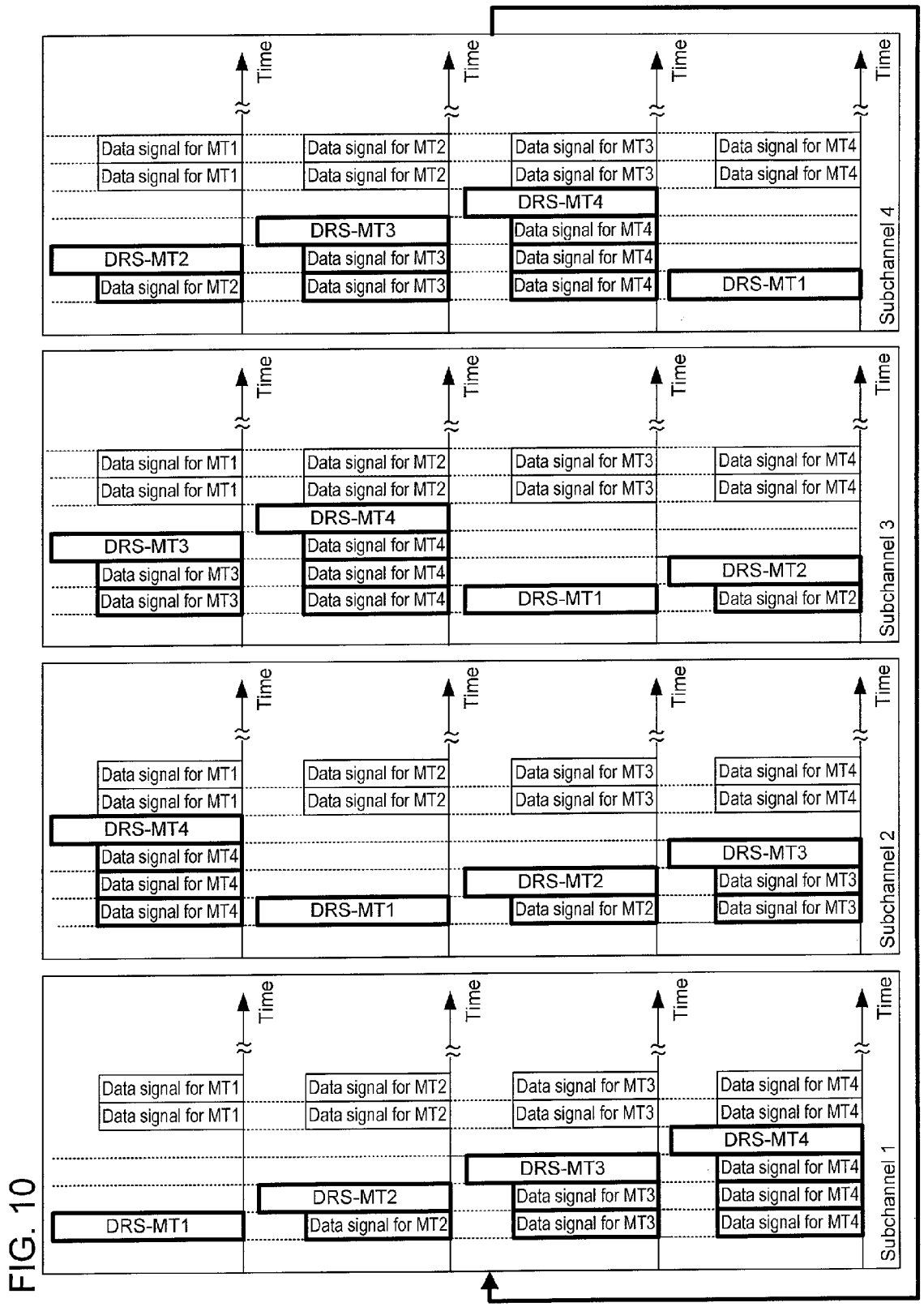
FIG. 10 is a diagram showing an exemplar configuration of a dedicated signal achieving uniform transmission rates for all MTs.

Note that although FIG. 9 and FIG. 10 show a case where the interference cancellation order is changed for subchannels arranged along a frequency domain as an example, the interference cancellation order may be changed for signals arranged along a time domain, a combination of these cases may be used, or otherwise a method of changing the interference cancellation opportunities may be evenly assigned by using different radio resources may be applied, and the embodiment is not limited to any method.

Third Embodiment

The received SNR of each MT in DL MU-MIMO THP shown in the first embodiment, becomes lower in later orders in the interference cancellation order on average. This is attributable to the QR decomposition performed in formula (12). In view of these circumstances, an object of this embodiment aims to achieve uniform reception characteristics among the MTs.

In DL MU-MIMO THP using QR decomposition described in this embodiment, received SNR of each MT is determined by a diagonal component of an equivalent channel $R^H$. In terms of physical concepts, the linear filter calculator 37 determines the equivalent channel $R^H$ under condition that an MT of a certain interference cancellation order does not interfere with an MT of an earlier interference cancellation order. Hence, the later an MT is in the interference cancellation order, the more limitations by conditions are set therefor, which results in securing only channels of inferior characteristics, and lowering the received SNR.

On the other hand, more data signals can be additionally allocated to radio resources for DRSs by the method described in the first embodiment, for MTs in later interference cancellation orders.

Accordingly, the BS can lower the coding rate in response to the number of data signals that can be additionally allocated to radio resources for DRSs, so that coding gain can be used to suppress the performance degradation due to the low received SNR from being later in the interference cancellation order. For example, the BS can allocate a redundant bit, which is punctured in the conventional example, to a data signal that can be additionally allocated to a radio resource for DRS. Alternatively, an information bit can be retransmitted instead of the redundant bit.

Additionally, configurations of the BS and MT of this embodiment are the same as the first embodiment except that decoding is carried out in consideration of the added redundant bit and the like, and thus explanations are omitted.

Note that although DL MU-MIMO THP using QR decomposition has been described in this embodiment, this embodiment is also applicable to schemes not using QR decomposition. This is because, similarly, even if QR decomposition is not used, in DL MU-MIMO THP where a BS successively cancels interference, it is more likely that channels of a good characteristic cannot be secured for an MT along with an increase in the number of MTs that should not be interfered. Without taking measures such as performing power control for keeping the received SNR of MTs constant, there are obviously other DL MU-MIMO THP schemes where received SNR of an MT of a later interference cancellation order becomes lower on average, and this embodiment is also applicable to such schemes.

Fourth Embodiment

Figure 21:
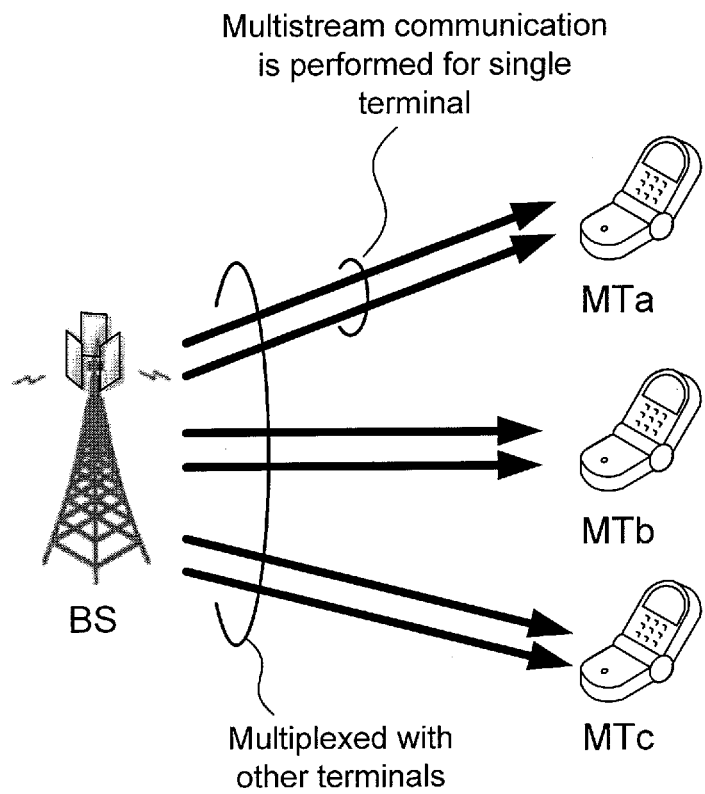
FIG. 21 is a diagram showing an exemplar configuration in which MTs each having multiple antennas and communicating with multiple datastreams by SU-MIMO are further spatially multiplexed by DL MU-MIMO at the same time at the same frequency (refer to non-patent document 3).
Figure 22:
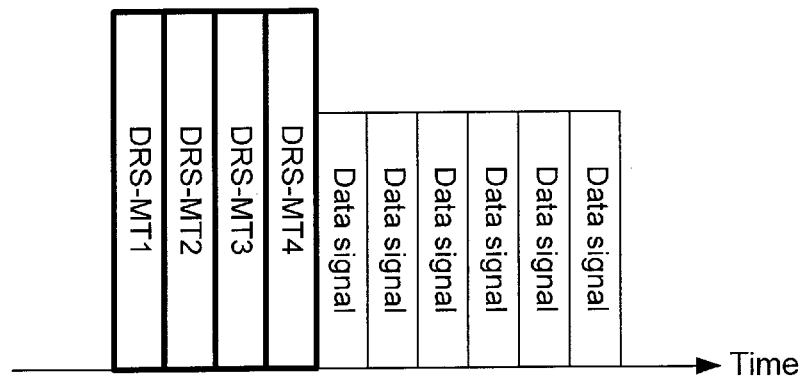
FIG. 22 is a diagram showing a configuration in which the BS transmits a DRS for MT1 (DRS-MT1), a DRS for MT2 (DRS-MT2) and so on by dividing them into different times, and transmits data signals by spatially multiplexing them by DL MU-MIMO THP.

The above-mentioned first to third embodiments are example cases of single stream communication in which the respective MTs receive a single data signal at the same time as the same frequency. In a fourth embodiment of this invention, an explanation will be given that the first to third embodiments can also be expanded to a situation of spatially multiplexing MTs each performing multistream communication (examples of MTa to c) as shown in FIG. 21.

Hereinbelow, a description will be given of configurations of a BS and an MT in this case with reference to the drawings. Although this embodiment will be described by using a case where each MT communicates using M streams at a time, as an example, the embodiment is not limited to this, and the number of communication streams may vary among the MTs.

Operations of the BS and the MT of this embodiment differ from those of the first to third embodiments in the following 4 points.

(i) Method of calculating linear filter (ii) Successive cancellation of interference for every M streams (iii) Notification of reception filter to MT by BS (iv) Acquisition of reception filter and multiplication of reception signal by the filter by MT These points will be described in order below.

(i) Regarding Method of Calculating Linear Filter

Figure 11:
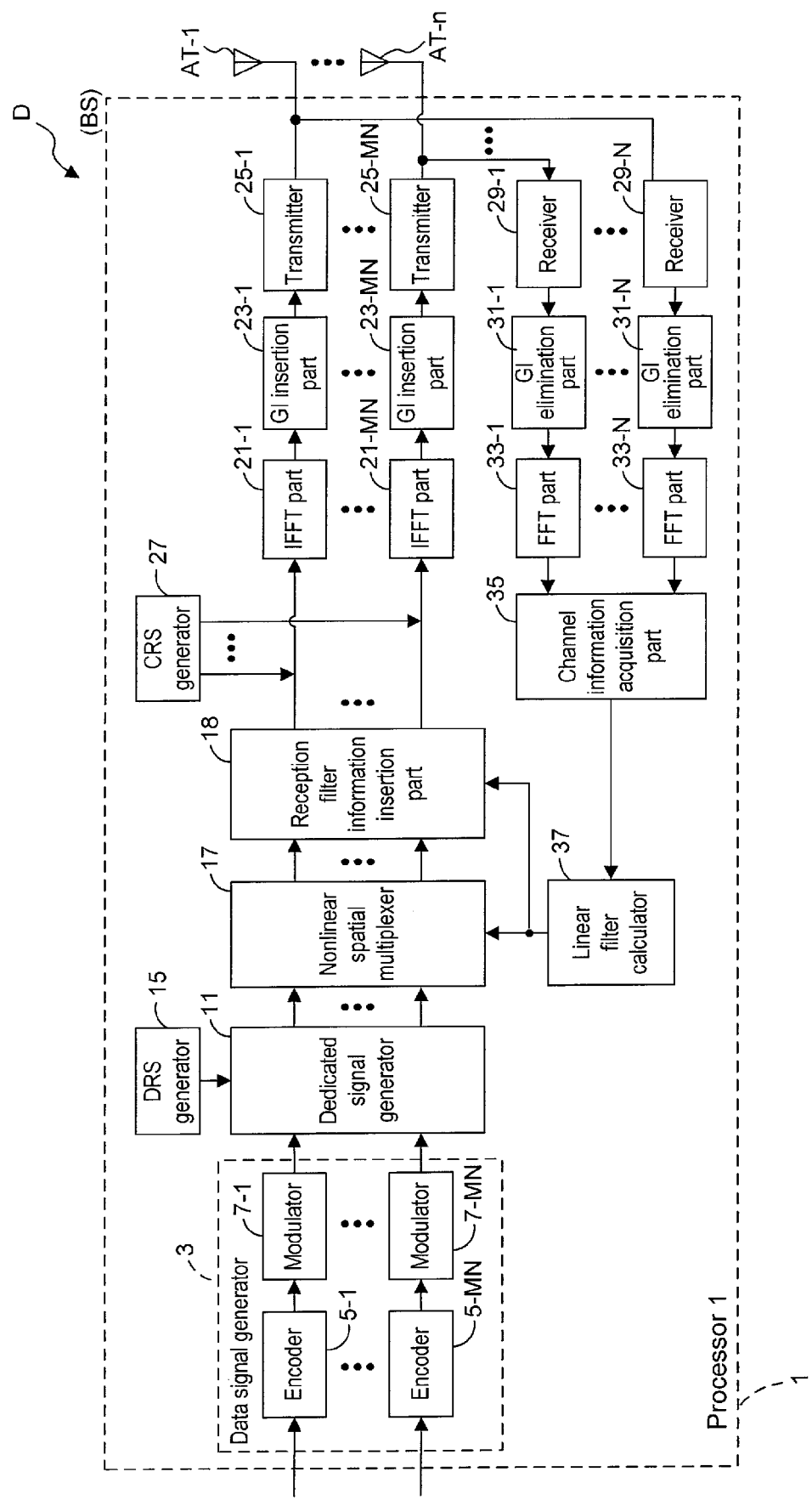
FIG. 11 is a diagram showing an exemplar configuration of a BS of this embodiment.

FIG. 11 shows an exemplar configuration of a BS of this embodiment. As in the case of the configuration of FIG. 1 in the first embodiment, FIG. 11 includes a linear filter calculator 37 for calculating a linear filter and interference coefficient information. In addition to the linear filter and the interference coefficient information, the linear filter calculator 37 of this embodiment calculates a reception filter and inputs it to a reception filter information insertion part 18. Since this operation of the linear filter calculator 37 is different from the first embodiment, details thereof will be described later.

(ii) Regarding Successive Cancellation of Interference for Every M Streams

Although in the first to third embodiments interference is cancelled in single-stream units in the nonlinear spatial multiplexer 17, interference is cancelled in M-stream units (i.e., in MT units) in this embodiment. For this reason, an interference calculator 32, an interference subtractor 34 and a Modulo operation part 36 each calculates signals in M-stream units.

A difference between processing of cancelling interference in single-stream units and processing of cancelling interference in M-stream units will be described below.

A description will be given by use of the nonlinear spatial multiplexer shown in FIG. 2. Although in the first to third embodiments each of the connections in FIG. 2 indicates that a single datastream passes therethrough, in this embodiment, M datastreams pass through each of the connections.

Every one of the arrows in FIG. 2 includes M datastreams passing therethrough. In FIG. 11, MN datastreams are inputted from the data signal generator 3. The nonlinear spatial multiplexer 17 (FIG. 2) receiving input of signals from the data signal generator 3 has N connections. This is because each connection includes M datastreams.

In the nonlinear spatial multiplexer 17 of this embodiment, M data streams for MT1 are collectively inputted to the interference calculator 32, and then the interference calculator 32 calculates M interference signals corresponding to the M streams of MT2, and inputs them to the interference subtractor 34-2. Subsequently, the interference subtractor 34-2 subtracts the M interference signals respectively corresponding to the streams from the M data streams for MT2, and then inputs the M signals after the subtraction to the Modulo operation part 36-2. The Modulo operation part 36-2 carries out a Modulo operation shown in formula (1) on each of the M signals. The Modulo operation part 36-2 inputs the calculated M signals after the Modulo operation to the interference calculator 32, as well as to the linear filter multiplier 30.

Thus, while successive interference cancellation is performed for a single stream at a time in the first to third embodiments, the cancellation is performed for M streams at a time in this embodiment. Processing M streams at a time in this manner is a characteristic of the fourth embodiment.

(iii) Notification of Reception Filter

Since the BS simultaneously transmits signals for MTs for each M streams, the MT needs to be capable of separating the received M streams. Accordingly, the BS calculates and notifies each MT of a reception filter. The MT multiplies the received signal directed thereto by this reception filter.

In addition, compared with the configuration shown in FIG. 1, it can be seen that the BS, whose configuration is shown in FIG. 11, additionally includes a reception filter information insertion part 18. The reception filter information insertion part 18 inserts the reception filter information generated by the linear filter calculator 37 to the dedicated signal generated by the nonlinear spatial multiplexer 17, and inputs the dedicated signal to which the reception filter information is inserted to the IFFT part 21-1 to MN.

Figure 12:
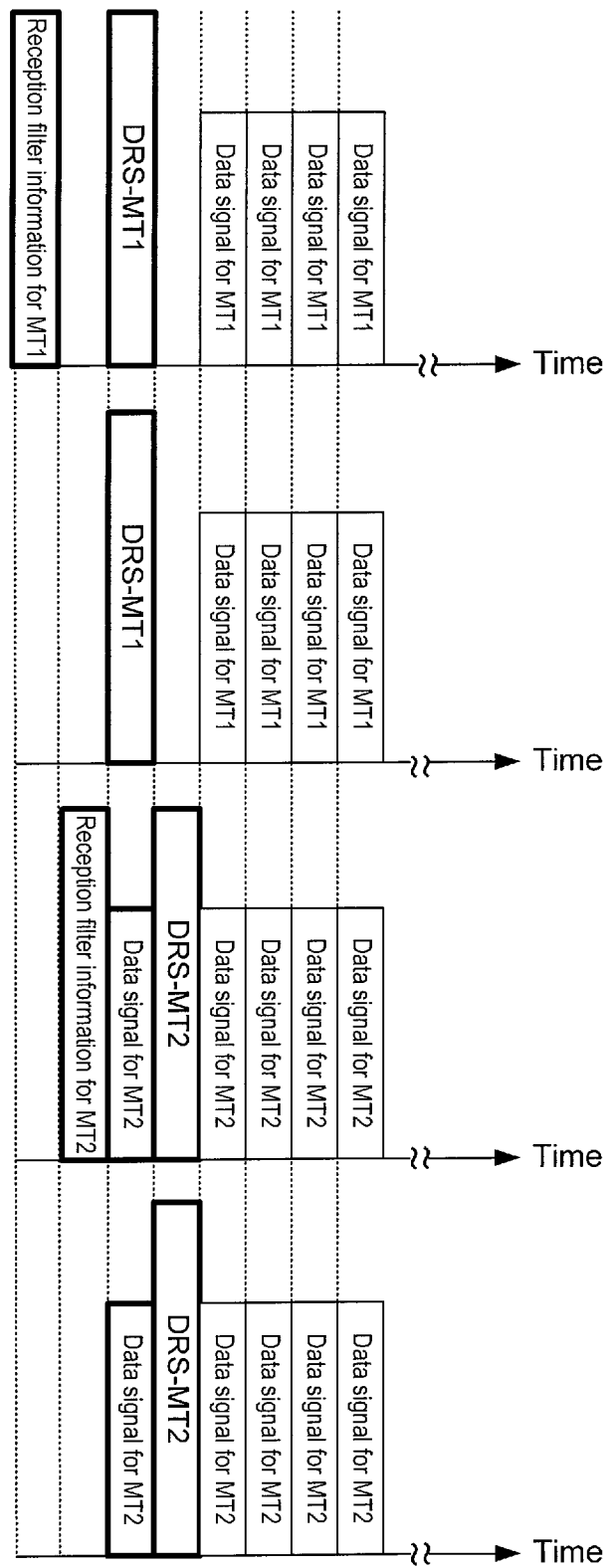
FIG. 12 shows a case in which 2 MTs are multiplexed and each of the MTs performs 2-stream communication, for example.

The dedicated signal may be configured as in FIG. 12, for example. In FIG. 12, an exemplar case is shown in which 2 MTs are multiplexed and each MT performs 2-stream communication. The dedicated signal shown in FIG. 12 includes reception filter information for the respective MTs, DRSs for the respective MTs, and data signals. Since DRSs and data signals can be separated by multiplying the signal by a reception filter, those addressed to the same MT are spatially multiplexed.

Figure 13:
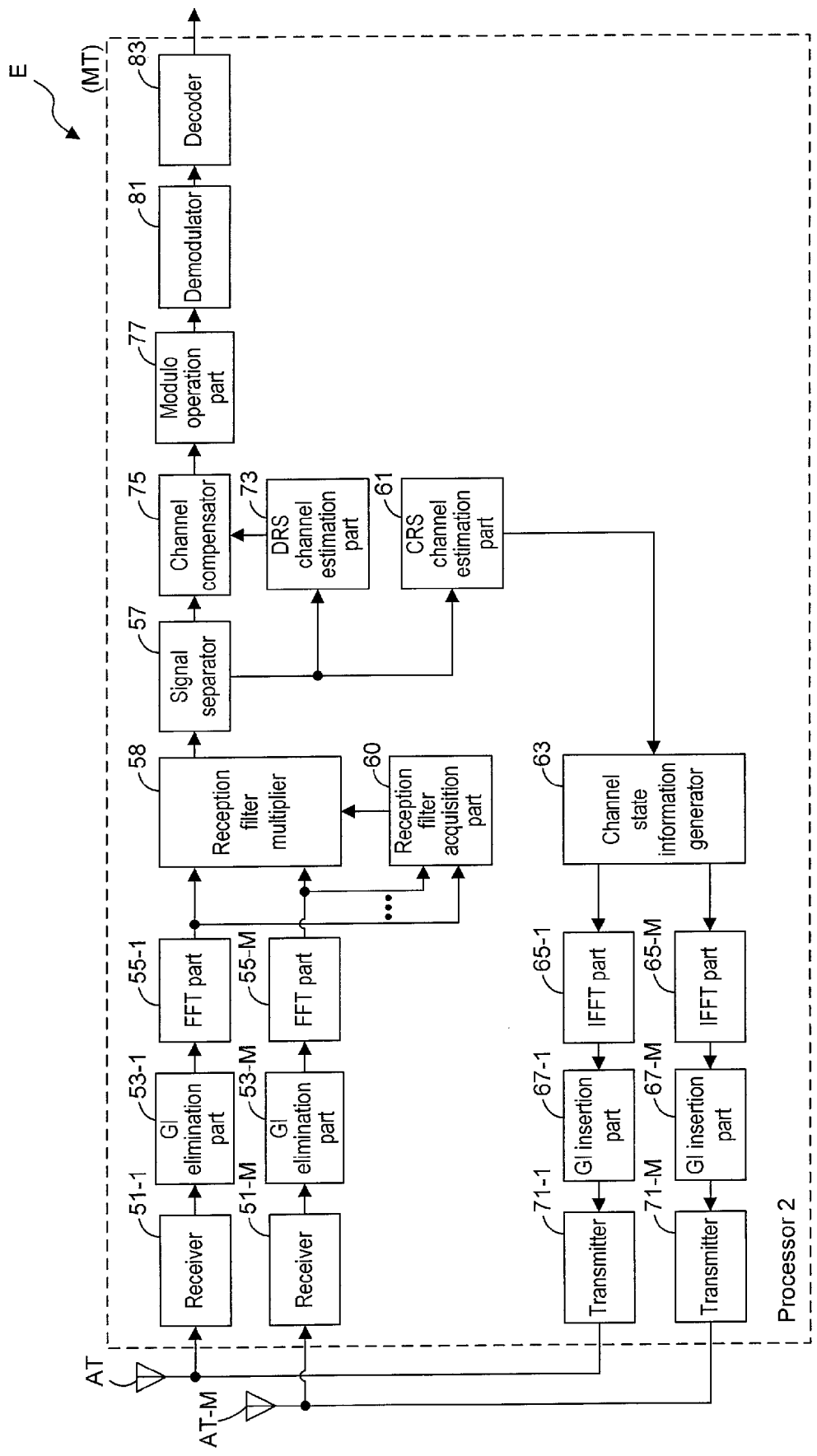
FIG. 13 is a diagram showing an exemplar configuration of an MT in a fourth embodiment of the present invention

(iv) Acquisition of Reception Filter and Multiplication of Reception Signal by the Filter by MT FIG. 13 shows an exemplar configuration of an MT of this embodiment. FIG. 13 shows a configuration example of an MT (E) including M antennas. As compared with the configuration example of the MT of the first embodiment, the MT of this embodiment includes M of the antennas (AT), receivers 51 and transmitters 71, which are larger in number than the counterparts in the first embodiment, and a newly-added reception filter multiplier 58 and reception filter acquisition part 60. The MT having received a signal including M streams and configured of data signals, DRSs and reception filter information firstly acquires a reception filter from the reception filter information in the reception filter acquisition part 60. The reception filter acquisition part 60 inputs the acquired reception filter to the reception filter multiplier 58. The reception filter multiplier 58 multiplies, from among the reception signals, the data signals and the DRSs by the reception filter and thus can separate all of the M streams of signals. In addition, the reception filter multiplier 58 inputs the separated M streams of signals to a signal separator 57. Thereafter, the MT can handle each of the streams as an absolutely independent stream.

Operations of the signal separator 57 and the operations thereafter are the same as the cases of the first to third embodiments, except that processing for signal separation, channel estimation and the like are carried out for every separated M streams. Additionally, upon receipt of a CRS, the reception filter multiplier 58 inputs the CRS to the signal separator 57 without multiplying it by any filter for estimation of the channel state.

Note that although in this embodiment a description has been given of a method in which the BS transmits reception filter information, and the MT separates multiple streams directed thereto by multiplying DRSs and data signals by a reception filter indicated by the reception filter information, the embodiment is not limited to this method. Other methods such as a method in which the MT separates multiple streams directed thereto may be used, as shown in a later-described modified example.

The four points described above are the differences between this embodiment and the aforementioned first to third embodiments. As to processing other than these, the first to third embodiments can be applied without change. A detailed description will be given below of a method of the linear filter calculator 37 for calculating a linear filter, interference coefficient information and a reception filter.

The linear filter calculator 37 according to this embodiment carries out 4 processes including i) calculation of Null Space, ii) calculation of MT specific filter iii) calculation of linear filter, and iv) calculation of interference coefficient information. In the end, the linear filter calculator 37 inputs the linear filter and the interference coefficient information to the nonlinear spatial multiplexer 17, and the reception filter to the reception filter information generator 18.

Here, to simplify the description of the operation of the linear filter calculator 37, a description will firstly be given of a situation including 2 MTs each having 2 antennas and a BS having 4 antennas as an example.

i) Calculation of Null Space

Figures 15, 16:
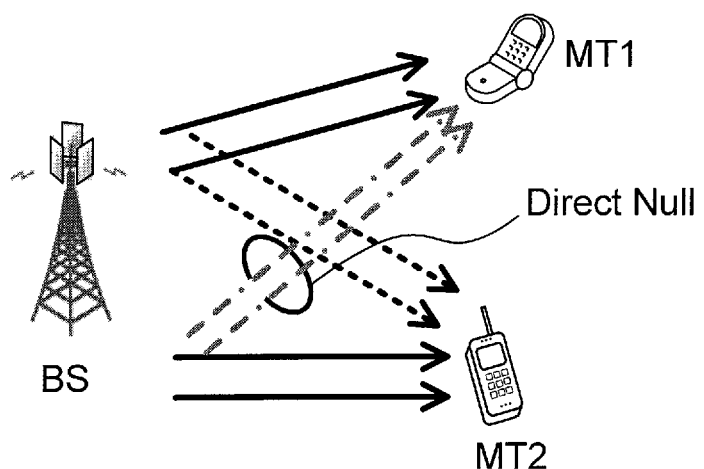
FIG. 15 is a diagram showing an exemplar configuration including a BS and MTs in a case of calculating a filter for preventing signals for MT2 from reaching MT1 (calculation of Null Space).
FIG. 16 is a diagram showing an example of a table ("Codebook") shared by a BS and an MT.
Figure 17:
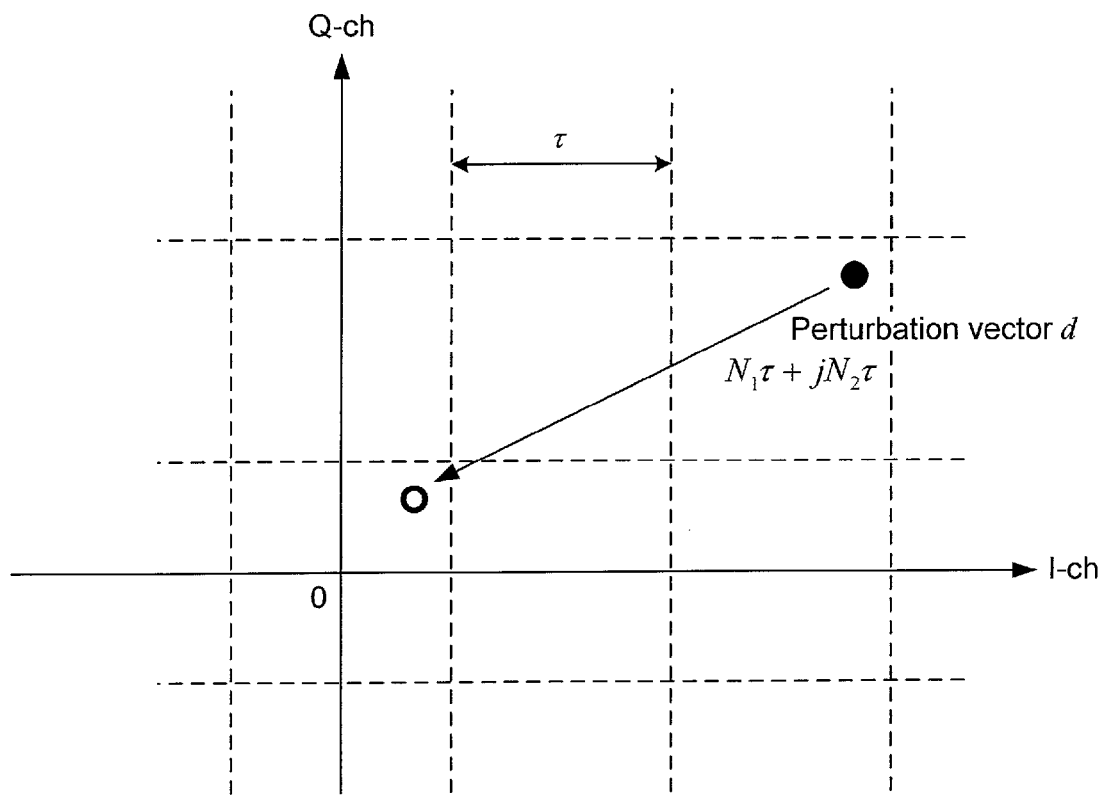
FIG. 17 is a diagram showing a principle of Modulo operation processing
Figure 18:
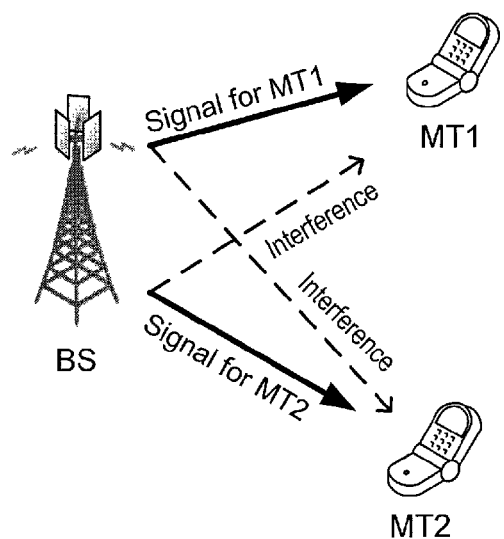
FIG. 18 is a functional block diagram showing an exemplar configuration in which: a base station (BS) transmits signals to multiple mobile terminals (MTs) at the same time at the same frequency, and a base station uses downlink (DL) Multi-User Multi Input Multi Output (MU-MIMO) as a method for multiplexing multiple MTs while using THP to cancel the MUI by using power efficiently.
Figure 19:
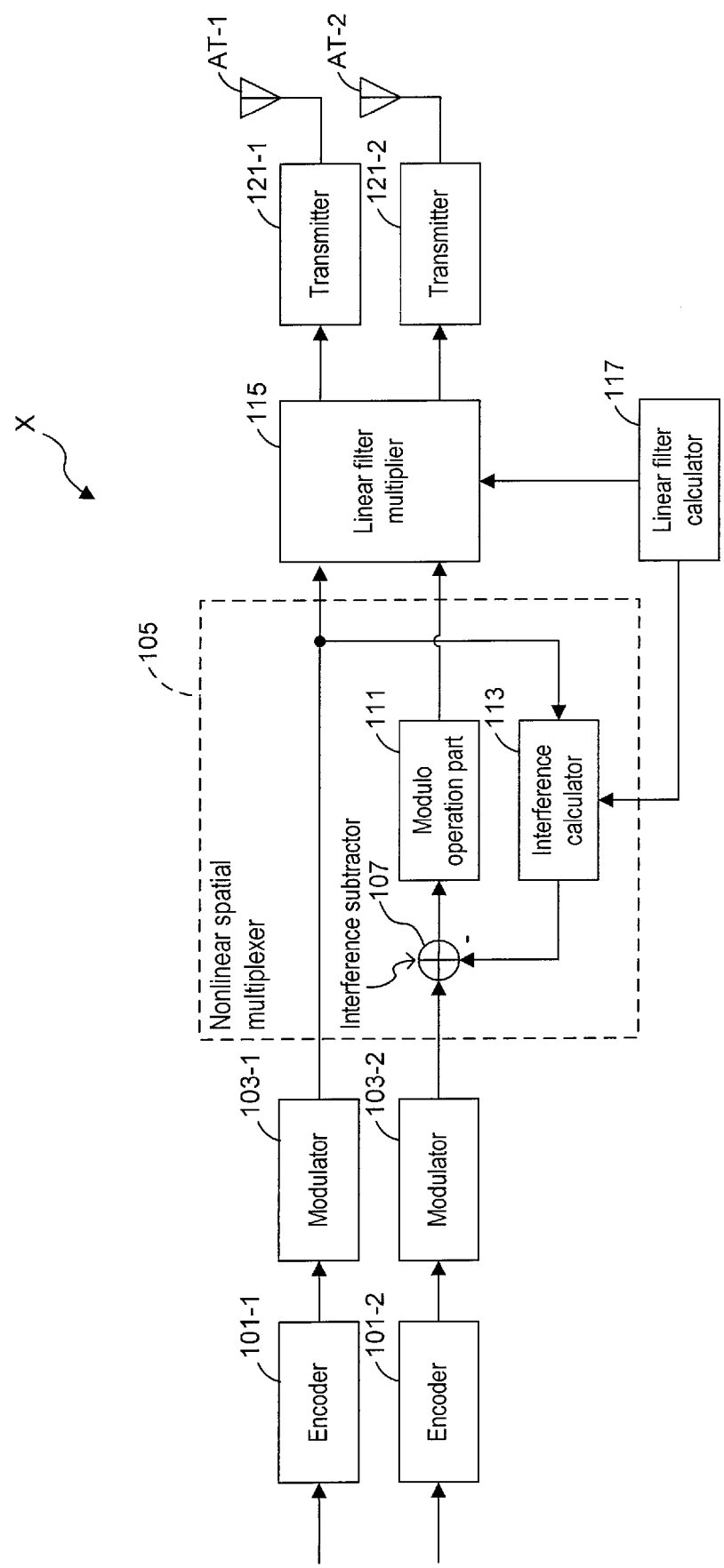
FIG. 19 is a diagram showing an exemplar configuration of a transmission function of a mobile terminal corresponding to FIG. 18.
Figure 20:
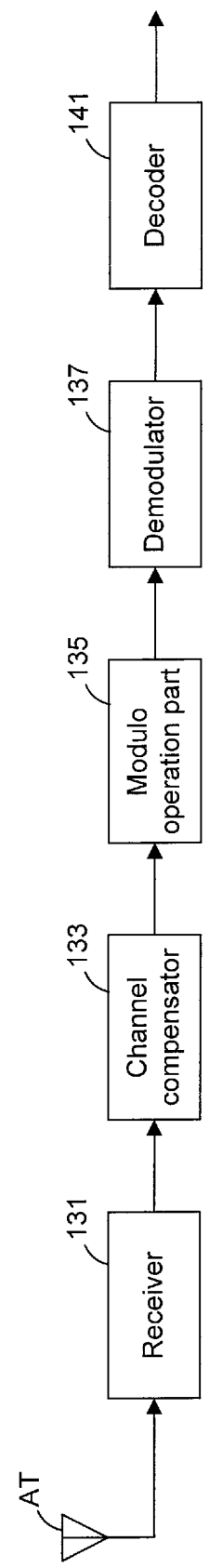
FIG. 20 is a diagram showing an exemplar configuration of a reception function of a mobile terminal corresponding to FIG. 18.

Calculation of a linear filter by which a signal for MT2 is multiplied and which prevents signals for MT2 from reaching MT1 as shown in FIG. 15 is called a calculation of Null Space.

Complex gain of channels between each transmission antenna of the BS and a reception antenna of the k-th MT is expressed as a 2×4 matrix $H_k$. In this description, k is the number of the MT after the ordering. Here, the entire channel matrix is expressed as:

[Formula 17]

$$H = \begin{bmatrix} H_1 \\ H_2 \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix}. \quad (17)$$

Here, to ensure consistency with a later mentioned case including 3 or more MTs, $H_1$ is replaced with a symbol $\hat{H}_2$. $\hat{H}_2$ represents a matrix obtained by eliminating $H_2$ from the entire channel matrix H, and when the number of MTs is 2, $H_1 = \hat{H}_2$. Then, $\hat{H}_2$ is subjected to singular value decomposition. After this operation, $\hat{H}_2$ is expressed as:

[Formula 18]

$$\hat{H}_2 = \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix} \begin{bmatrix} \hat{V}_{2,11} & \hat{V}_{2,12} & \hat{V}_{2,13} & \hat{V}_{2,14} \\ \hat{V}_{2,21} & \hat{V}_{2,22} & \hat{V}_{2,23} & \hat{V}_{2,24} \\ \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix}. \quad (18)$$

Here, on the right side of formula (18), each of the leftmost matrix and the third matrix from the left are a unitary matrix. In addition, in the second matrix from the left, only the components of first row first column and second row second column are positive real numbers. An Hermitian conjugate of a matrix corresponding to the third and fourth rows of the third matrix from the left is defined as:

[Formula 19]

$$\hat{V}_2^{ker} = \begin{bmatrix} \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix}^H. \quad (19)$$

Here, a signal obtained by multiplying a modulated signal $s = [s^t_1, s^t_2]^t$ by $\hat{V}_2^{ker}$ as a linear filter is expressed as:

[Formula 20]

$$H_1 \hat{V}_2^{ker} s = \hat{H}_2 \hat{V}_2^{ker} s \quad (20)$$

$$= \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix}$$

$$\begin{bmatrix} \hat{V}_{2,11} & \hat{V}_{2,12} & \hat{V}_{2,13} & \hat{V}_{2,14} \\ \hat{V}_{2,21} & \hat{V}_{2,22} & \hat{V}_{2,23} & \hat{V}_{2,24} \\ \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix} \begin{bmatrix} \hat{V}^*_{2,31} & \hat{V}^*_{2,41} \\ \hat{V}^*_{2,32} & \hat{V}^*_{2,42} \\ \hat{V}^*_{2,33} & \hat{V}^*_{2,43} \\ \hat{V}^*_{2,34} & \hat{V}^*_{2,44} \end{bmatrix}$$

$$\begin{bmatrix} s_1 \\ s_2 \end{bmatrix}$$

$$= \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix} \begin{bmatrix} 0 & 0 \\ 0 & 0 \\ 1 & 0 \\ 0 & 1 \end{bmatrix} \begin{bmatrix} s_1 \\ s_2 \end{bmatrix}$$

$$= \begin{bmatrix} \hat{U}_{2,11} & \hat{U}_{2,12} \\ \hat{U}_{2,21} & \hat{U}_{2,22} \end{bmatrix} \begin{bmatrix} 0 & 0 \\ 0 & 0 \end{bmatrix} \begin{bmatrix} s_1 \\ s_2 \end{bmatrix} = \begin{bmatrix} 0 \\ 0 \end{bmatrix}.$$

The resultant signal never reaches MT1 having the channel $H_1$. In other words, Null of the signal multiplied by $\hat{V}_2^{ker}$ as a linear filter is directed completely toward the channel $H_1$. To be precise, $\hat{V}_2^{ker}$ of this matrix represents a Null Space of the channel $\hat{H}_2$. Accordingly, a signal transmitted after multiplying a modulated signal $s = [s^t_1, s^t_2]^t$ by a linear filter $\hat{V}_2^{ker}$ neither reaches MT1 nor interferes with MT1. For this reason, if a signal for MT2 is multiplied by this linear filter $\hat{V}_2^{ker}$, the signal for MT2 can be prevented from reaching MT1 as interference.

ii) Calculation of MT Specific Filter

After being multiplied by the linear filter $\hat{V}_2^{ker}$, the signal for MT2 does not interfere with MT1 and thus can be considered as an SU-MIMO channel ($H_2 \hat{V}_2^{ker}$ indicated by arrows directed from the BS to MT2 in FIG. 15. To calculate an MT specific filter means to calculate an appropriate filter by which this SU-MIMO channel should be multiplied on the BS side. Moreover, an MT specific filter is also calculated for a signal for MT1. Since interferences are eliminated from the signal for MT1 later by the interference subtractor 34 and the Modulo operation part 36 (FIG. 2), it is not a problem that the signal for MT1 interferes with MT2. Hence, multiplication by a linear filter like $\hat{V}_2^{ker}$ for MT2 is unnecessary, and it suffices that only the MT specific filter for the SU-MIMO channel ($H_1$) between only the BS and the MT1 is calculated. The specific filter for MT2 is obtained by performing singular value decomposition again on the channel $H_2$ for MT2 multiplied by $\hat{V}_2^{ker}$ obtained in formula (18) ($H_2 \hat{V}_2^{ker}$). Since $H_2 \hat{V}_2^{ker}$ is a 2×2 matrix, the following can be obtained by subjecting it to singular value decomposition:

[Formula 21]

$$H_2 \hat{V}_2^{ker} = \begin{bmatrix} U_{2,11} & U_{2,12} \\ U_{2,21} & U_{2,22} \end{bmatrix} \begin{bmatrix} \Sigma_{2,1} & 0 \\ 0 & \Sigma_{2,2} \end{bmatrix} \begin{bmatrix} V_{2,11} & V_{2,12} \\ V_{2,21} & V_{2,22} \end{bmatrix}. \quad (21)$$

An Hermitian conjugate of the rightmost matrix of the right side of formula (21) is defined as an MT specific filter $V_2^{Im}$.

In addition, as for signals for MT1, an MT specific filter can be obtained by performing singular value decomposition on $H_1$.

[Formula 22-1]

$$H_1 = \begin{bmatrix} U_{1,11} & U_{1,12} \\ U_{1,21} & U_{1,22} \end{bmatrix} \begin{bmatrix} \Sigma_{1,1} & 0 \\ 0 & \Sigma_{1,2} \end{bmatrix} \begin{bmatrix} V_{1,11} & V_{1,12} & V_{1,13} & V_{1,14} \\ V_{1,21} & V_{1,22} & V_{1,23} & V_{1,24} \end{bmatrix}. \quad (22\text{-}1)$$

An Hermitian conjugate of the rightmost matrix of the right side of formula (22-1) is defined as an MT specific filter $V_1^{Im}$.

iii) Calculation of Linear Filter

The linear filters ($\hat{V}_2^{ker}, V_k^{Im}$ (k=1,2)) obtained in formulae (19), (21) and (22-1) by which the signals for MT1 and MT2 should by multiplied are collectively defined as the following linear filter.

[Formula 22-2]

$$P = [V_1^{Im}, \hat{V}_2^{ker} \hat{V}_2^{Im}] \quad (22\text{-}2)$$

Through multiplication by this linear filter P, signals for MT1 can be multiplied by the optimal MT specific filter for an SU-MIMO from the BS to MT1, and at the same time signals for MT2 can be multiplied by the optimal MT specific filter under the limitation that the Null is directed toward MT1. This P corresponds to Q in the first embodiment, and the filter multiplier inputs this P to the linear filter multiplier 30.

iv) Calculation of Interference Coefficient Filter

HP considered as an equivalent channel is expressed as:

[Formula 23]

$$HP = T = \begin{bmatrix} T_{11} & 0 \\ T_{21} & T_{22} \end{bmatrix}. \quad (23)$$

Here, $T_{11}$, $T_{21}$ and $T_{22}$ are 2×2 matrixes. $T_{11}$ and $T_{22}$ indicate channel states when signals transmitted from the BS to MT1 and MT2 reach the correct MTs respectively. In addition, $T_{21}$ indicates a channel state when a signal transmitted from the BS to MT1 reaches MT2 as interference. The right upper component of formula (24) being 0 indicates that a signal for MT2 does not reach MT1 as interference.

The BS calculates an interference coefficient filter using this equivalent channel T. An interference coefficient filter is a filter for calculating an interference component which remains after channel compensation by MT2, by use of the equivalent channel T. $T_{21}$ being a part of the equivalent channel T represents the channel through which the signal for MT1 which interferes with MT2 passes. However, since T represents interference components before channel compensation by MT2, in this scheme, a channel for the interference signal after the channel compensation needs to be calculated.

When only the channels for the data signals are taken out, the channels are expressed as:

[Formula 24]

$$B = \begin{bmatrix} T_{11} & 0 \\ 0 & T_{22} \end{bmatrix}. \quad (24)$$

This corresponds to an expanded case of A of the first embodiment including multiple reception antennas. Channel compensation is performed by multiplying by an inverse matrix of B, whereby the interference component is expressed as:

[Formula 25]

$$B^{-1}T - I = \begin{bmatrix} 0 & 0 \\ T_{22}^{-1}T_{21} & 0 \end{bmatrix}. \quad (25)$$

The unit matrix I is subtracted in the left side of formula (25) to eliminate the components for data signals. With these calculations, interference coefficient information $B^{-1}T-I$ and a linear filter P can be obtained.

Additionally, the reception filter is the Hermitian conjugate of the leftmost matrix of the right side of formula (20) and formula (21).

[Formula 26]

$$U_1 = \begin{bmatrix} U_{1,11} & U_{1,12} \\ U_{1,21} & U_{1,22} \end{bmatrix}^H, U_2 = \begin{bmatrix} U_{2,11} & U_{2,12} \\ U_{2,21} & U_{2,22} \end{bmatrix}^H \quad (26)$$

The linear filter calculator 37 inputs this reception filter to the reception filter information insertion part 18.

Hereinabove, the description has been given of the case including the 2 MTs each having 2 antennas, and the BS having 4 antennas. Next, the operation of the linear filter calculator 37 is described by use of a generalized case including N of the MTs each having M antennas.

i) Calculation of Null Space

Complex gain of channels for each antenna of the BS to an antenna of the k-th MT is expressed as an M×MN matrix $H_k$. In this description, k is the number of the MT after the ordering. To be specific, an MT corresponding to $H_1$ is an MT which does not correspond to THP, and the rest of the MTs are MTs corresponding to THP. The entire channel matrix is expressed as:

[Formula 27]

$$H = [H_1^t, H_2^t, \ldots, H_N^t]^t \quad (27)$$

A matrix of the first to k−1 th channels taken out of this entire channel matrix is expressed as:

[Formula 28]

$$\hat{H}_k = [H_1^t, H_2^t, \ldots, H_{k-1}^t]^t \quad (28)$$

This matrix $\hat{H}_k$ is an M(k−1)×MN matrix. Thereafter, $\hat{H}_k$ is subjected to singular value decomposition.

[Formula 29]

$$\hat{H}_k = \hat{U}_k^{11} \hat{\Sigma}_k [\hat{V}_k^{Im}, \hat{V}_k^{ker}]^H \quad (29)$$

Here, $\hat{V}_k^{Im}$ is defined as an MN×M(k−1) matrix, and $\hat{V}_k^{ker}$ is defined as an MN×M(N−k+1) matrix. Since a rank of $\hat{H}_k$ is M(k−1) at most, $\hat{V}_k^{ker}$ obtained by eliminating the first M(k−1) columns of $[\hat{V}_k^{Im}, \hat{V}_k^{ker}]$ corresponds to the Null Space. In other words, the space that the column vector of $\hat{V}_k^{ker}$ spans is referred to as Null Space. This means that when a vector obtained by multiplying an arbitrary M(N−k) dimension vector x by $\hat{V}_k^{ker}$ from the left is further multiplied by $\hat{H}_k$ from the left, the result is always 0. Considering that $\hat{H}_k$ is a matrix representing channels corresponding to first to k−1th MTs, a signal transmitted after being multiplied by the filter $\hat{V}_k^{ker}$ in the BS does not interfere with other signals when passing through the channels $\hat{H}_k$ corresponding to the first to k−1th MTs. This is a generalization of formula (20).

ii) Calculation of MT Specific Filter

Next, optimal precoding is performed for every N signals for MTs. ($H_k \hat{V}_k^{ker}$) obtained by multiplying a channel $H_k$ corresponding to the k-th MT by $\hat{V}_k^{ker}$ found in formula (29) is subjected to singular value decomposition again.

[Formula 30]

$$H_k \hat{V}_k^{ker} = U_k \Sigma_k [V_k^{Im}, V_k^{ker}]^H \quad (30)$$

Since $H_k \hat{V}_k^{ker}$ is an M×M(N−k+1) matrix, $H_k \hat{V}_k^{ker}$ is M rank at most. First M columns of $[\hat{V}_k^{Im}, \hat{V}_k^{ker}]$ are defined as MT specific filters $\hat{V}_k^{Im}$. Moreover, $\hat{V}_k^{Im}$ is an M(N−k)×M matrix.

iii) Calculation of Linear Filter

A linear filter is expressed as follows by using $\hat{V}_k^{Im}$ and $\hat{V}_k^{ker}$ obtained in formulae (29) and (30):

[Formula 31]

$$P = [\hat{V}_1^{ker} V_1^{Im}, \hat{V}_2^{ker} V_2^{Im}, \ldots, \hat{V}_N^{ker} V_N^{Im}] \quad (31)$$

This P corresponds to Q in the first embodiment, and the filter multiplier 30 inputs this P to the linear filter multiplier.

iv) Calculation of Interference Coefficient Filter

HP considered as an equivalent channel is expressed as:

[Formula 32]

$$HP = T = \begin{bmatrix} T_{11} & 0 & \cdots & 0 \\ T_{21} & T_{22} & \ddots & \vdots \\ \vdots & & \ddots & 0 \\ T_{N1} & \cdots & & T_{NN} \end{bmatrix} \quad (32)$$

Here, $T_{ik}$ is an M×M matrix, and is a channel matrix that a signal for the k-th MT can be considered to pass through when it reaches the i-th MT. $T_{ik}$ (i=k) represents a channel through which a signal transmitted from the BS side to each MT reaches the correct MT, and $T_{ik}$ (i≠k) represents a channel through which a signal for a different MT reaches an MT as interference. Although this equivalent channel corresponds to $R^H$ of the first embodiment, $R^H$ of the first embodiment is a complete lower triangular matrix, whereas in this embodiment T is a lower triangular matrix except for a matrix $T_{ii}$ in a diagonal portion representing a channel for data signals. In other words, T is triangulated for M×M matrix block units. When only the channels for the data signals are taken out, the channels are expressed as:

[Formula 33]

$$B = \begin{bmatrix} T_{11} & 0 & \cdots & 0 \\ 0 & T_{22} & \ddots & \vdots \\ \vdots & & \ddots & 0 \\ 0 & \cdots & 0 & T_{NN} \end{bmatrix} \quad (33)$$

This corresponds to an expanded case of A of the first embodiment including multiple reception antennas. As in the first embodiment, an interference coefficient filter is calculated as follows, to calculate a signal for offsetting interference that the MT undergoes after data signals have passed through channels expressed by formula (21):

[Formula 34]

$$B^{-1}T - I = \begin{bmatrix} 0 & 0 & \cdots & 0 \\ T_{22}^{-1}T_{21} & 0 & \ddots & \vdots \\ \vdots & \ddots & \ddots & 0 \\ T_{NN}^{-1}T_{N1} & \cdots & T_{NN}^{-1}T_{N(N-1)} & 0 \end{bmatrix} \quad (34)$$

The interference coefficient filter thus calculated is inputted to the interference calculator 32. As for the reception filter, an Hermitian conjugate $U^H_k$ of $U_k$ in formula (30) is the k-th MT. Accordingly, the linear filter calculator 37 inputs this $U^H_k$ to the reception filter information insertion part 18.

These are details of the operation of the linear filter calculator 37 according to the communication system of this embodiment.

Moreover, based on formulae (30) and (31), an equivalent channel including multiplication of the reception filter is expressed as:

[Formula 35]

$$U_k H_k \hat{V}_k^{ker} V_k^{lm} = U_k U_k^H \Sigma_k [V_k^{lm}, V_k^{ker}]^H V_k^{lm} \quad (35)$$
$$= \Sigma_k.$$

Specifically, components of first row first column, second row second column, ... M-th row M-th column of $\Sigma_k$ represent the equivalent channels of the respective streams including multiplication of the reception filters. The channel compensator performs channel compensation by estimating the above components from the DRSs and multiplying the data signals by the components.

These are details of the operation of the linear filter calculator according to the communication system of this embodiment.

FIRST MODIFIED EXAMPLE

In this embodiment, as described in the above (iii), a method has been described in which the BS transmits the reception filter, and the MT separates the DRSs and data signals into respective streams by use of the reception filter. In this first modified example, a description will be given of a method in which a BS does not transmit a reception filter, but instead an MT separates a data signal into respective streams.

Figure 14:
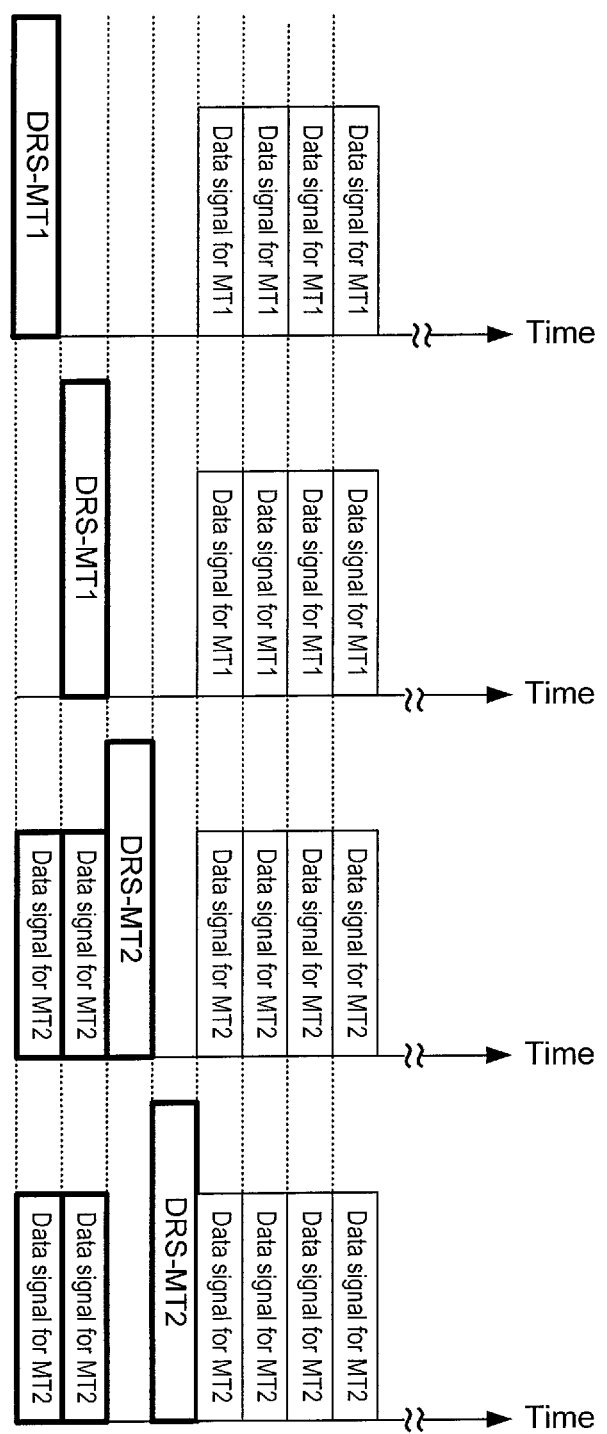
FIG. 14 is a diagram showing a frame configuration of a modified example of the present invention which is an example where the BS, unlike FIG. 12, does not transmit reception filters but transmits DRSs for respective MTs by orthogonal radio resources, not for each MT but for each stream.

Firstly, a frame configuration will be described by using the configuration shown in FIG. 14 as an example. The frame configuration of the modified example shown in FIG. 14 is different from that in FIG. 12 in that the BS does not transmit reception filters, but transmits DRSs for the respective MTs by orthogonal radio resources not for each MT, but for each stream.

The configuration of the BS according to the first modified example is formed by eliminating the reception filter information insertion part 18 from FIG. 11 so that output of a nonlinear spatial multiplexer 17 is directly inputted to an IFFT part 21 and thus can be understood by referring to FIG. 11. In addition, the configuration of the MT according to the first modified embodiment is that shown in FIG. 13, except that the reception filter multiplier 58 and the reception filter acquisition part 60 are eliminated, and output of each FFT part 55 is inputted to a signal separator 57. Each MT can estimate an equivalent channel matrix $U_k\Sigma_k$ by receiving a DRS by a DRS channel estimation part 73. Data signals are also received by the MT through the same equivalent channel matrix $U_k\Sigma_k$.

Accordingly, a channel compensator 75 of the MT can multiply the data signal by an inverse matrix of this matrix, separate the data signal into respective streams, and normalize the amplitude of the data signal. The MT inputs the signal calculated by the channel compensator 75 to a Modulo operation part 77.

(Description Related to Chip Claim)

Moreover, functions according to the BS of the above method may be executed in a processor 1 as shown in FIG. 11. The processor 1 (D) includes the receivers 29, the channel information acquisition part 35, the CRS generator 27, the reception filter information insertion part 18 and the data signal generator 3 in addition to the DRS generator 15, the nonlinear spatial multiplexer 17, and the transmitters 25 executing the method of the present application. However, the configuration is not limited to this, and may alternatively include only the DRS generator 15, the nonlinear spatial multiplexer 17 and the transmitters 25, or may be a configuration including other functions together with the functions, no limitation being set as to which of the functions should be configured in a chip.

Furthermore, functions according to the MT of the above method may be executed in a processor 2 as shown in FIG. 13. The processor 2 includes the signal separator 57, the channel compensator 75, the CRS channel estimation part 61, the channel state information generator 63, the transmitter 71, the Modulo operation part 77, the demodulator 81, the decoder 83, the reception filter multiplier 58 and the reception filter acquisition part 60 in addition to the receiver 51 and the DRS channel estimation part 73 executing the method of the present application. However, the configuration is not limited to this, and may alternatively include only the receiver 51 and the DRS channel estimation part 73, or may be a configuration including other functions together with the functions.

Explanation Common to all Embodiments

The following points can be considered for the embodiments and modified example thereof described above.

Specifically, other than the linear filter calculation method described by using this embodiment and the like as an example, DL MU-MIMO THP using a linear filter based on an MMSE criterion described in the aforementioned non-patent document 2 may be applied, or a method using ordering also described in the aforementioned non-patent document 2 may be used.

Moreover, when the MT notifies the BS of the information estimated on the basis of the CRS, the BS may be notified of quantized values indicating components of H being a matrix representing the channel state. Otherwise, the BS and the MT may share a table (called "Codebook" below) as shown in FIG. 16 in advance, so that the MT can select, based on the CRS, one of 0 to 7 numbers corresponding to a channel directed to itself from among 8 channel information values in FIG. 16, and notify the BS of the selected number. The form of the Codebook is not limited to that shown in FIG. 16, as a matter of course, and other Codebooks may be used.

Although in the configurations of the dedicated signals in the embodiments respective DRSs are arranged in the time domain in FIG. 4B and the like, the invention is not limited to this. The configuration of the dedicated signal of this invention may include radio resources for DRSs arranged in the frequency domain as in FIG. 5, for example, or arranged in both the time and frequency domains as in FIG. 6.

Similarly in these cases, the BS can spatially multiplex a DRS and data signals for an MT of a later interference cancellation order than an MT being a destination of the DRS. Specifically, when 4 MTs are multiplexed, a radio resource for transmitting DRS-MT1 can transmit data signals for MT2 to MT4, and a radio resource for transmitting DRS-MT2 can transmit data signals for MT3 and MT4, for example.

In addition, although the examples of the present invention have been described for cases of performing OFDM communication, the invention is also applicable to systems in which single-carrier communication other than OFDM communication is performed in the uplink, downlink or both.

Further, although for convenience the number of antennas included in the BS and MT in each of the above embodiments is matched with the number of datastreams with which the MT communicates, the number of antennas that the MT physically has may differ from the number mentioned in the description. For example, if an MT receives signals by physically 2 antennas but is designed to combine the received signals into a single signal, the description of this invention considers the MT to have a single antenna for convenience.

Note that in the above embodiments and the like, examples have been shown in which DRSs and data signals are spatially multiplexed in nonlinear MU-MIMO transmission, where part of interference among users is subtracted from a desired transmission signal to generate a signal to be actually transmitted. However, such spatial multiplexing of DRSs and data signals is also applicable to a case of performing linear MU-MIMO transmission. Linear MU-MIMO transmission is a method in which interference among users is cancelled by multiplying a signal by a linear filter according to a channel matrix. Here, it is possible to avoid a situation where a DRS and a data signal interferes with each other, by transmitting a resource for transmitting DRS after multiplying it by a linear filter according to a channel matrix, and thereby spatially multiplexing the DRS and the data signal.

Each of programs operating on the mobile terminal and on the base station according to this invention is a program (program causing a computer to function) for controlling a CPU or the like to implement the functions of the above embodiments and the like related to the present invention. Information handled by these devices is temporarily accumulated in a RAM at the time of processing by the device, and then is stored in various ROMs and HDDs to be read, modified or written to by a CPU according to need. As the recording medium for storing the program, any of a semiconductor medium (such as a ROM, a nonvolatile memory card and the like), an optical recording medium (such as a DVD, an MO, an MD, a CD, a BD and the like), a magnetic recording medium (such as a magnetic tape, a flexible disc and the like) may be used, for example. In addition, the functions of the above embodiment are implemented not only by executing a loaded program, but also the functions of this invention may be implemented by performing processing in cooperation with an operating system, another application program or the like based on instructions from the program.

Moreover, if the program is to be distributed in a market, the program may be stored in a portable recording medium for distribution, or may be transferred to a server computer connected via a network such as the Internet. In this case, a memory of the server computer is included in the invention. Additionally, part of or all of the mobile terminal and the base station of the above embodiments may be implemented as an LSI which is typically an integrated circuit. Each of functional blocks of the mobile terminal and the base station may each be implemented as a processor, or part of or all of the functional blocks may be integrated as a processor. Moreover, the method of fabricating the integrated circuit may be implemented not only with LSI, but may be implemented with a dedicated circuit, or a general-purpose processor. If a technique for integrated circuit fabrication substituting LSI is developed with advancement of semiconductor technology, an integrated circuit fabricated by the technique may also be used.

Hereinabove, embodiments of this invention have been described in detail with reference to the drawings. However, concrete configurations are not limited to the embodiments, and design and the like that do not depart from the gist of the invention are included in the scope of claims.

INDUSTRIAL APPLICABILITY

The present invention is applicable to a communication device.

All publications, patent and patent applications cited in this description are incorporated herein by reference in their entirety.

EXPLANATION OF REFERENCE NUMERALS

A ... base station, 1 ... processor, 3 ... data signal generator, 5 ... encoder, 7 ... demodulator, 9 ... signal replacement part, 11 ... dedicated signal generator, 15 ... DRS generator, 17 ... nonlinear spatial multiplexer, 18 ... reception filter information insertion part, 21 ... IFFT part, 23 ... GI insertion part, 25 ... transmitter, AT ... antenna, 27 ... CRS generator, 29 ... receiver, 30 ... linear filter multiplier, 31 ... GI elimination part, 32 ... interference calculator, 33 ... FFT part, 34 ... interference subtractor, 35 ... channel information acquisition part, 36 ... Modulo operation part, 37 ... linear filter calculator, B ... mobile terminal (MT), 51 ... receiver, 53 ... GI elimination part, 55 FFT part, 57 ... signal separator, 58 ... reception filter multiplier, 60 ... reception filter acquisition part, 61 ... CRS channel estimation part, 63 ... channel state information generator, 65 ... IFFT part, 67 ... GI insertion part, 71 ... transmitter, 73 ... DRS channel estimation part, 75 ... channel compensator, 77 ... Modulo operation part, 81 ... demodulator, and 83 ... decoder.

The invention claimed is:

1. A transmission device including a plurality of transmission antennas that is configured for transmitting signals in the same channel at the same time point to a plurality of reception devices, the transmission device comprising:
   a dedicated reference signal generator configured to generate dedicated reference signals for the respective reception devices;
   a data signal generator configured to generate data signals for the respective reception devices;
   a nonlinear spatial multiplexer configured to spatially multiplex, using nonlinear processing, at least some of the dedicated reference signals and at least some of the data signals; and
   a transmitter configured to transmit the spatially multiplexed signals, wherein
   the nonlinear spatial multiplexer is further configured to:
      determine an order of the plurality of reception devices corresponding to an order interference cancellation, and
      multiplex the dedicated reference signal for the reception device with the data signal for the later reception device in the determined order than the reception device being the destination of the dedicated reference signal.

2. The transmission device according to claim 1, wherein the nonlinear spatial multiplexer includes processing of
   calculating an interference of the dedicated reference signal for the earlier reception device in the order affecting the later reception device in the order, and
   cancelling the interference from the data signal for the later reception device in the order.

3. The transmission device according to claim 1, wherein the nonlinear spatial multiplexer is farther configured to carry out a Modulo operation on the data signal after the interference cancellation.

4. The transmission device according to claim 1, wherein with respect to one or a plurality of radio resources as a unit, the order is determined so that opportunities are evenly assigned to the reception devices.

5. The transmission device according to claim 4, wherein the order is changed so that the reception devices are cyclically replaced in each of the units.

6. The transmission device according to claim 1, wherein the data signal to be spatially multiplexed with the dedicated reference signal includes control information.

7. The transmission device according to claim 1, wherein the transmission device is further configured to perform error-correction coding by a lower code rate on information hits of a signal for the later reception device in the order, and then transmits the signal.

8. A transmission method comprising:
   generating dedicated reference signals for respective reception devices;
   generating data signals for the respective reception devices;
   spatially multiplexing, using nonlinear processing, at least some of the dedicated reference signals and at least some of the data signals;
   transmitting the spatially multiplexed signals;
   determining an order of the plurality of reception devices corresponding to an order interference cancellation; and
   multiplexing the dedicated reference signal for the reception device with the data signal for the later reception device in the determined order than the reception device being the destination of the dedicated reference signal.

9. A non-transitory computer-readable medium comprising computer-executable instructions for causing one or more processor(s) and/or memory to perform:
   generating dedicated reference signals for respective reception devices;
   generating data signals for the respective reception devices;
   spatially multiplexing, using nonlinear processing, at least some of the dedicated reference signals and at least some of the data signals;
   transmitting the spatially multiplexed signals;
   determining an order of the plurality of reception devices corresponding to an order interference cancellation; and
   multiplexing the dedicated reference signal for the reception device with the data signal for the later reception device in the determined order than the reception device being the destination of the dedicated reference signal.

* * * * *